United States Patent
Jacobsen et al.

(10) Patent No.: US 9,933,213 B1
(45) Date of Patent: *Apr. 3, 2018

(54) COMPOSITE STRUCTURES WITH ORDERED THREE-DIMENSIONAL (3D) CONTINUOUS INTERPENETRATING PHASES

(75) Inventors: Alan J. Jacobsen, Santa Monica, CA (US); William B. Barvosa-Carter, Malibu, CA (US); Adam F. Gross, Los Angeles, CA (US); Robert Cumberland, Malibu, CA (US); Kevin W. Kirby, Calabasas, CA (US); David Kisailus, Venice, CA (US)

(73) Assignee: HRL Laboratories, LLC, Malibu, CA (US)

( * ) Notice: Subject to any disclaimer, the term of this patent is extended or adjusted under 35 U.S.C. 154(b) by 646 days.

This patent is subject to a terminal disclaimer.

(21) Appl. No.: 13/490,376

(22) Filed: Jun. 6, 2012

Related U.S. Application Data

(62) Division of application No. 12/008,479, filed on Jan. 11, 2008, now Pat. No. 8,320,727.

(51) Int. Cl.
  *B05D 3/02* (2006.01)
  *F28D 20/02* (2006.01)
  (Continued)

(52) U.S. Cl.
  CPC .......... *F28D 20/023* (2013.01); *B22F 1/0007* (2013.01); *C04B 38/0032* (2013.01)

(58) Field of Classification Search
  CPC .................................................. C04B 38/0032
  (Continued)

(56) References Cited

U.S. PATENT DOCUMENTS

| 787,065 A | 4/1905 | White |
|---|---|---|
| 796,768 A | 8/1905 | Steinmetz |

(Continued)

FOREIGN PATENT DOCUMENTS

| CN | 101043078 A | 9/2007 |
|---|---|---|
| WO | WO 2009/048676 A1 | 4/2009 |

(Continued)

OTHER PUBLICATIONS

Jacobsen, A.J. (2007), Synthesis and mechanical evaluation of micro-scale truss structures formed from self-propagating polymer waveguides, University of Southern California, p. 1-111.*

(Continued)

*Primary Examiner* — Tabatha Penny
(74) *Attorney, Agent, or Firm* — Lewis Roca Rothgerber Christie, LLP

(57) ABSTRACT

A method of forming a three-dimensional (3D) composite structure includes: securing a mask between a collimated light source and a volume of a photo-monomer; directing a collimated light beam from the collimated light source to the mask for a period of exposure time such that a portion of the collimated light beam passes through the mask and is guided by a plurality of apertures into the photo-monomer to form a plurality of waveguides through a portion of the volume of the photo-monomer; removing any uncured photo-monomer to leave behind a three-dimensional ordered open-cellular microstructure to define an open volume and a structure of a first continuous material of the three-dimensional composite material; and placing a second continuous material in the open volume, wherein the second continuous material and the first continuous material share an interface between each other, and wherein the interface is everywhere continuous.

21 Claims, 13 Drawing Sheets

(51) Int. Cl.
*C04B 38/00* (2006.01)
*B22F 1/00* (2006.01)

(58) Field of Classification Search
USPC .................................................... 427/376.2
See application file for complete search history.

(56) References Cited

U.S. PATENT DOCUMENTS

| | | | |
|---|---|---|---|
| 3,765,299 A | 10/1973 | Pagano et al. | |
| 3,977,294 A | 8/1976 | Jahn | |
| 4,030,427 A | 6/1977 | Goldstein | |
| 4,219,597 A | 8/1980 | Maistre | |
| 4,309,487 A | 1/1982 | Holmes | |
| 4,400,421 A | 8/1983 | Stover | |
| 4,488,920 A * | 12/1984 | Danis | 156/155 |
| 4,568,595 A | 2/1986 | Morris | |
| 4,575,330 A | 3/1986 | Hull | |
| 4,604,249 A | 8/1986 | Luhleich et al. | |
| 4,722,089 A | 1/1988 | Botez et al. | |
| 4,757,665 A | 7/1988 | Hardigg | |
| 4,876,941 A | 10/1989 | Barnes et al. | |
| 5,006,937 A | 4/1991 | Nonoshita et al. | |
| 5,070,673 A | 12/1991 | Weisse | |
| 5,114,772 A | 5/1992 | Vives et al. | |
| 5,185,297 A | 2/1993 | Park et al. | |
| 5,221,807 A | 6/1993 | Vives | |
| 5,265,185 A | 11/1993 | Ashley | |
| 5,288,538 A | 2/1994 | Spears | |
| 5,290,642 A | 3/1994 | Minh et al. | |
| 5,306,557 A | 4/1994 | Madison | |
| 5,361,678 A | 11/1994 | Roopchand et al. | |
| 5,372,978 A | 12/1994 | Ezis | |
| 5,394,490 A | 2/1995 | Kato et al. | |
| 5,401,694 A | 3/1995 | Gesing et al. | |
| 5,402,514 A | 3/1995 | Booth et al. | |
| 5,435,226 A | 7/1995 | McQuilkin | |
| 5,471,905 A | 12/1995 | Martin | |
| 5,654,518 A | 8/1997 | Dobbs | |
| 5,723,807 A | 3/1998 | Kuhn, II | |
| 5,763,813 A | 6/1998 | Cohen et al. | |
| 5,767,022 A | 6/1998 | Clere et al. | |
| 5,861,203 A | 1/1999 | Yuan et al. | |
| 5,932,397 A | 8/1999 | Mustacich | |
| 5,980,813 A | 11/1999 | Narang et al. | |
| 6,086,814 A | 7/2000 | Krenkel et al. | |
| 6,108,998 A | 8/2000 | Dumlao | |
| 6,112,635 A | 9/2000 | Cohen | |
| 6,176,874 B1 | 1/2001 | Vacanti et al. | |
| 6,261,981 B1 | 7/2001 | Dietrich et al. | |
| 6,266,134 B1 | 7/2001 | Gelbart | |
| 6,274,288 B1 | 8/2001 | Kewitsch et al. | |
| 6,289,781 B1 | 9/2001 | Cohen | |
| 6,341,190 B1 | 1/2002 | Summersgill et al. | |
| 6,379,962 B1 | 4/2002 | Holy et al. | |
| 6,387,593 B1 | 5/2002 | Kewitsch et al. | |
| 6,399,187 B1 | 6/2002 | Terasaki et al. | |
| 6,472,210 B1 | 10/2002 | Holy et al. | |
| 6,480,734 B1 | 11/2002 | Zhang et al. | |
| 6,500,401 B2 | 12/2002 | Reznck et al. | |
| 6,523,450 B1 | 2/2003 | Schreiber | |
| 6,510,260 B2 | 6/2003 | Chen et al. | |
| 6,575,075 B2 | 6/2003 | Cohen | |
| 6,582,812 B1 | 6/2003 | Grylls et al. | |
| 6,592,787 B2 | 7/2003 | Pickrell et al. | |
| 6,609,452 B1 | 8/2003 | McCormick et al. | |
| 6,631,231 B2 | 10/2003 | Mizuuchi et al. | |
| 6,650,817 B2 | 11/2003 | Murali | |
| 6,660,192 B1 | 12/2003 | Kim et al. | |
| 6,670,039 B1 | 12/2003 | Nagle et al. | |
| 6,684,007 B2 | 1/2004 | Yoshimura et al. | |
| 6,698,331 B1 | 3/2004 | Yu et al. | |
| 6,764,628 B2 | 7/2004 | Lobovsky et al. | |
| 6,823,116 B2 | 11/2004 | Inui et al. | |
| 6,826,996 B2 | 12/2004 | Strait | |
| 6,855,428 B2 | 2/2005 | Lau et al. | |
| 6,861,205 B2 | 3/2005 | Bowman et al. | |
| 6,862,393 B2 | 3/2005 | Nashimoto | |
| 6,870,976 B2 | 3/2005 | Chen et al. | |
| 6,875,442 B2 | 4/2005 | Holy et al. | |
| 6,879,757 B1 | 4/2005 | Zhou et al. | |
| 6,887,809 B1 | 5/2005 | Adler | |
| 6,898,362 B2 | 5/2005 | Forbes et al. | |
| 6,917,749 B2 | 7/2005 | Gao et al. | |
| 6,925,233 B2 | 8/2005 | Inui et al. | |
| 6,929,866 B1 | 8/2005 | Williams et al. | |
| 6,932,880 B2 | 8/2005 | Inui et al. | |
| 6,941,888 B2 | 9/2005 | Barsoum | |
| 6,952,504 B2 | 10/2005 | Bi et al. | |
| 6,955,112 B1 | 10/2005 | Adams et al. | |
| 6,993,235 B2 | 1/2006 | Takagi et al. | |
| 6,993,406 B1 | 1/2006 | Cesarano, III et al. | |
| 7,006,747 B2 | 2/2006 | Escuti et al. | |
| 7,014,661 B2 | 3/2006 | Blunn et al. | |
| 7,020,374 B2 | 3/2006 | Talin et al. | |
| 7,022,522 B2 | 4/2006 | Guan et al. | |
| 7,024,093 B2 | 4/2006 | Shelnut et al. | |
| 7,026,045 B2 | 4/2006 | Rettenbacher et al. | |
| 7,069,836 B1 | 7/2006 | Palicka et al. | |
| 7,070,755 B2 | 7/2006 | Klett et al. | |
| 7,085,467 B2 | 8/2006 | Ikemoto et al. | |
| 7,117,780 B2 | 10/2006 | Cohen | |
| 7,128,963 B2 | 10/2006 | Benitsch | |
| 7,133,592 B2 | 11/2006 | Yasuda et al. | |
| 7,205,252 B2 | 4/2007 | Becker et al. | |
| 7,209,622 B2 | 4/2007 | Hoshi et al. | |
| 7,288,326 B2 | 10/2007 | Elzey et al. | |
| 7,382,959 B1 | 6/2008 | Jacobsen | |
| 7,401,643 B2 | 7/2008 | Queheillalt et al. | |
| 7,406,909 B2 | 8/2008 | Shah et al. | |
| 7,421,159 B2 | 9/2008 | Yang et al. | |
| 7,424,967 B2 | 9/2008 | Ervin et al. | |
| 7,490,539 B2 | 2/2009 | Ma | |
| 7,531,120 B2 | 5/2009 | Van Rijn et al. | |
| 7,582,394 B2 | 9/2009 | Noda et al. | |
| 7,601,654 B2 | 10/2009 | Bhatnagar et al. | |
| 7,609,922 B2 | 10/2009 | Aoki et al. | |
| 7,653,276 B1 | 1/2010 | Gross et al. | |
| 7,653,279 B1 | 1/2010 | Jacobsen | |
| 7,687,132 B1 | 3/2010 | Gross et al. | |
| 7,691,284 B2 | 4/2010 | Cumberland et al. | |
| 7,811,640 B2 | 10/2010 | Charters et al. | |
| 7,901,462 B2 | 3/2011 | Yang et al. | |
| 7,913,611 B2 | 3/2011 | Terry et al. | |
| 7,938,989 B1 | 5/2011 | Gross et al. | |
| 7,963,085 B2 | 6/2011 | Sypeck et al. | |
| 7,980,165 B2 | 7/2011 | Misencik et al. | |
| 8,132,493 B1 | 3/2012 | Adams | |
| 8,155,496 B1 | 4/2012 | Cumberland et al. | |
| 8,197,930 B1 | 6/2012 | Jacobsen et al. | |
| 2001/0017342 A1 * | 8/2001 | Walls et al. | 249/134 |
| 2002/0012768 A1 | 1/2002 | Cohen | |
| 2003/0057040 A1 | 3/2003 | Bauer et al. | |
| 2004/0021237 A1 | 2/2004 | Shimizu et al. | |
| 2004/0063984 A1 | 4/2004 | Shen et al. | |
| 2004/0084811 A1 | 5/2004 | Beebe et al. | |
| 2004/0154252 A1 | 8/2004 | Sypeck et al. | |
| 2004/0200417 A1 | 10/2004 | Hanawa et al. | |
| 2004/0241412 A1 | 12/2004 | Huener et al. | |
| 2004/0253365 A1 | 12/2004 | Warren et al. | |
| 2004/0264863 A1 | 12/2004 | Suzuki et al. | |
| 2005/0072294 A1 | 4/2005 | Cohen | |
| 2005/0135745 A1 | 6/2005 | Greiner et al. | |
| 2005/0154567 A1 | 7/2005 | Jackman et al. | |
| 2005/0163988 A1 | 7/2005 | Ebert et al. | |
| 2005/0202206 A1 | 9/2005 | Wadley et al. | |
| 2005/0221150 A1 | 10/2005 | Revol | |
| 2005/0255289 A1 | 11/2005 | Wadley | |
| 2005/0287696 A1 | 12/2005 | Dumais et al. | |
| 2006/0029348 A1 | 2/2006 | Kempen et al. | |
| 2006/0029349 A1 | 2/2006 | Hoshi et al. | |
| 2006/0048640 A1 | 3/2006 | Terry et al. | |
| 2006/0062987 A1 | 3/2006 | Niewohner et al. | |
| 2006/0080835 A1 | 4/2006 | Kooistra et al. | |
| 2006/0105184 A1 | 5/2006 | Palicka et al. | |

(56) References Cited

U.S. PATENT DOCUMENTS

| | | | |
|---|---|---|---|
| 2006/0133762 A1 | 6/2006 | Yasuda et al. | |
| 2006/0137517 A1 | 6/2006 | Palicka et al. | |
| 2006/0186565 A1 | 8/2006 | Huener et al. | |
| 2006/0225180 A1 | 10/2006 | Ben-Simhon | |
| 2006/0234577 A1 | 10/2006 | Wagner et al. | |
| 2006/0244165 A1 | 11/2006 | Huang | |
| 2007/0017662 A1* | 1/2007 | Valenzuela | 165/170 |
| 2007/0034462 A1 | 2/2007 | Themelin et al. | |
| 2007/0089595 A1 | 4/2007 | Shah et al. | |
| 2007/0113730 A1 | 5/2007 | Benyami et al. | |
| 2007/0142202 A1 | 6/2007 | Yang et al. | |
| 2007/0180981 A1 | 8/2007 | Tapp et al. | |
| 2007/0196066 A1* | 8/2007 | Wang et al. | 385/129 |
| 2007/0238005 A1 | 10/2007 | Yagi et al. | |
| 2007/0243315 A1 | 10/2007 | Buckley | |
| 2007/0254975 A1* | 11/2007 | Arney et al. | 522/99 |
| 2007/0298309 A1 | 12/2007 | Vyas et al. | |
| 2009/0035510 A1 | 2/2009 | Chakrabarti | |
| 2009/0133571 A1 | 5/2009 | Pfister | |
| 2009/0274865 A1 | 11/2009 | Wadley et al. | |
| 2010/0159294 A1 | 6/2010 | Fly et al. | |
| 2010/0159303 A1 | 6/2010 | Rock et al. | |
| 2010/0236759 A1 | 9/2010 | Wadley et al. | |
| 2010/0323181 A1 | 12/2010 | Nutt et al. | |
| 2011/0042512 A1 | 2/2011 | Wadley et al. | |
| 2011/0107904 A1 | 5/2011 | Queheillalt et al. | |
| 2011/0283873 A1 | 11/2011 | Wadley et al. | |

FOREIGN PATENT DOCUMENTS

| | | |
|---|---|---|
| WO | WO 2009/061539 A2 | 5/2009 |
| WO | WO 2010/010989 | 1/2010 |

OTHER PUBLICATIONS

Studart, Andre R. et al., Processing Routes to Macroporous Ceramics: A Review, J. Am. Ceram. Soc., 89(6), p. 1771-1789 (2006).*

Wang, Thermal Expansions and Mechanical Properties of Al/C and Al/(SiC+C) Composites based on Wood Templates, Materials Transactions, vol. 47, No. 10 (2006), p. 2576-2581.*

Dismukes, Chemical Synthesis of Microporous Nonoxide Ceramics from Polysilazanes, Chem. Mater. 1997, 9, p. 699-706.*

Stampfl, Rapid prototyping and manufacturing by gelcasting of metallic and ceramic slurries, Materials Science and Engineering A334, (2002), p. 187-192.*

Kelly et al., Industrial applications for LIGA-fabricated micro heat exchangers, MEMS Components and Applications for Industry, Automobiles, Aerospace, and Communication, Proceedings of SPIE, vol. 4559 (2001), p. 73-84.*

Kumar et al., Colloidal Processing and Gel Casting of Alumina, Internal Confreence on Advanced Materials and Composites (ICAMC-2007, Oct. 24-26, 2007, p. 679-683.*

Zhu et al., Low-temperature fabrication of porous SiC ceramics by perceramic polymer reaction bonding, Materials Letters, 59 (2005), p. 595-597.*

Bertsch et al., "Microstereolithography: A Review", Materials Research Symposium Proceedings, 2003, 1-13, vol. 758, USA, 13 pages.

Chuang et al., "A New Method to Fabricate Polymer Waveguides", Progress in Electromagnetics Research Symposium, Aug. 22-26, 2005, 92-95, Hangzhou, China, 4 pages.

Daoulas et al., 'Fabrication of Complex Three-Dimensional Nanostructures from Self-Assembling Block Copolymyer Materials on Two-Dimensional Chemically Patterned Templates with Mismatched Symmetry', Physical Review Letters, Jan. 27, 2006, pp. 1-4, vol. 96, U.S.A.

Epps et al., 'Network Phases in ABC Triblock Copolymers', Macromolecules, Apr. 2, 2004, pp. 7085-7088, vol. 37, U.S.A.

Jang et al., "3D Polymer Microframes That Exploit Length-Scale-Dependent Mechanical Behavior", Advanced Materials, 2006, 2123-2127, vol. 18, 5 pages.

Kagami et al., "Light-Induced Self-Written Three-Dimensional Optical Waveguide", Applied Physics Letters, Aug. 20, 2001, 1079-1081, vol. 79 (No. 8), USA, 3 pages.

Kewitsch et al., "Nonlinear Optical Properties of Photoresists for Projection Lithography", Applied Physics Letters, Jan. 22, 1996, 455-457, vol. 68 (No. 4), USA, 3 pages.

Notice of Allowance dated Feb. 14, 2008, for related U.S. Appl. No. 11/580,335 (now U.S. Pat. No. 7,382,959), 6 pages.

Notice of Allowance dated Nov. 17, 2009, for related U.S. Appl. No. 12/074,727, 9 pages.

Notice of Allowance dated Sep. 24, 2009, for related U.S. Appl. No. 12/075,033, 7 pages.

Notice of Allowance dated Sep. 8, 2010, for related U.S. Appl. No. 12/589,262, 8 pages.

Office Action dated Apr. 4, 2007, for related U.S. Appl. No. 11/580,335, (now U.S. Pat. No. 7,382,959), 16 pages.

Office Action dated Dec. 17, 2007, for related U.S. Appl. No. 11/580,335 (now U.S. Pat. No. 7,382,959), 8 pages.

Shoji et al., "Optically-Induced Growth of Fiber Patterns into a Photopolymerizable Resin", Applied Physics Letters, Aug. 2, 1999, 737-739, vol. 75 (No. 5), USA, 3 pages.

Sun et al., "Two-Photon Photo Polymerization and 3D Lithographic Microfabrication", APS, 2004, 169-273, vol. 170, USA. 118 pages.

Zeschky et al., 'Preceramic Polymer Derived Cellular Ceramics', Composites Science and Technology, Jan. 13, 2003, pp. 2361-2370, vol. 63, U.S.A.

U.S. Notice of Allowance dated May 18, 2012, for cross reference U.S. Appl. No. 13/370,256 (now U.S. Pat. No. 8,272,309), (14 pages).

U.S. Office action dated May 26, 2011, for cross reference U.S. Appl. No. 12/705,534 (now U.S. Pat. No. 8,435,438), (13 pages).

U.S. Office action dated Mar. 28, 2012, for cross reference U.S. Appl. No. 12/705,534 (now U.S. Pat. No. 8,435,438), (11 pages).

U.S. Office action dated Sep. 6, 2012, for cross reference U.S. Appl. No. 12/705,534 (now U.S. Pat. No. 8,435,438), (8 pages).

U.S. Office action dated Jun. 11, 2012, for cross reference U.S. Appl. No. 12/577,991 (now U.S. Pat. No. 8,465,825), (23 pages).

U.S. Notice of Allowance dated Feb. 27, 2013, for cross reference U.S. Appl. No. 12/577,991 (now U.S. Pat. No. 8,465,825), (18 pages).

U.S. Office action dated Oct. 26, 2012, for cross reference U.S. Appl. No. 13/560,932 (now U.S. Pat. No. 8,541,015), (17 pages).

U.S. Office action dated Dec. 9, 2011, for cross reference U.S. Appl. No. 12/341,062 (now U.S. Pat. No. 8,268,510), (9 pages).

U.S. Office action dated Dec. 2, 2011, for cross reference U.S. Appl. No. 12/466,405 (now U.S. Pat. No. 8,309,274), (12 pages).

U.S. Office action dated Apr. 4, 2012, for cross reference U.S. Appl. No. 12/466,405 (now U.S. Pat. No. 8,309,274), (15 pages).

* cited by examiner

COMPOSITE STRUCTURES WITH ORDERED THREE-DIMENSIONAL (3D) CONTINUOUS INTERPENETRATING PHASES

The present application is a divisional of U.S. patent application Ser. No. 12/008,479, filed on Jan. 11, 2008, now U.S. Pat. No. 8,320,727 entitled "Composite Structures with Ordered Three-Dimensional (3D) Continuous Interpenetrating Phases," and relates to a three-dimensional (3D) composite structure and a method of making the same.

FIELD OF THE INVENTION

Background of the Invention

A composite material is composed of at least two distinct constituent materials or phases, that when combined have physical properties unlike the individual phases. The physical properties of a composite material are determined by the physical properties of the constituent materials, the volume or mass ratio of each phase, the interface properties between each of the phases, and the geometry of the phases. This invention disclosure is related to the relative geometry of the constituent phases.

The constituent phases of a two-phase composite material are commonly termed for their mechanical function, i.e. reinforcement phase and matrix phase. The reinforcement phase provides the majority of the mechanical support while the matrix phase distributes the load between/to the reinforcement phase. Reinforcement materials are commonly in the form of particles, short fibers, or continuous fibers, and the bulk mechanical properties of a composite material can range from isotropic to highly anisotropic depending on the shape and orientation of the reinforcement phase; however, these common reinforcement materials do not constitute a continuous phase. The matrix phase is, by definition, the only continuous phase in these types of composites. Although much of the work in composite materials is related to the mechanical properties, other physical properties are of importance and are also a function of the geometry of the constituent phases. For example, theoretical studies have been done to determine the optimum geometry for a two-phase composite to maximize both thermal and electrical conductivity. See Torquato et al., "Multifunctional Composites: Optimizing Microstructures For Simultaneous Transport Of Heat And Electricity," Phys. Rev. Lett. 89, 266601 (2002), Issue 26, the entire content of which is incorporated herein by reference.

Work has also been done on creating various forms of composite materials with two interpenetrating, yet distinct continuous phases. These include materials where one phase is an open cellular foam—derived from a material such as a polymer, ceramic, or metal—and then infiltrated with a dissimilar material to create a composite. See Klett et al., "Pitch-Based Carbon Foam And Composites And Use Thereof," U.S. Pat. No. 7,070,755, Jul. 4, 2006; Grylls et al., "Article Made Of A Ceramic Foam Joined To A Metallic Nonfoam, And Its Preparation," U.S. Pat. No. 6,582,812, Jun. 24, 2003; Rettenbacher et al., "Multilayer Composite Armour," U.S. Pat. No. 7,026,045, Apr. 11, 2006; Williams et al., "Composite Foam Structures," U.S. Pat. No. 6,929,866, Aug. 16, 2005; Terasaki et al., "Metal-Ceramics Composite, Heat Dissipation Device Employing It, And Processes For Producing Them," U.S. Pat. No. 6,399,187, Jun. 4, 2002; and Zeschky et al., "Preceramic Polymer Derived Cellular Ceramics," Composites Science and Technology, Vol. 63 (2003) 2361-2370; the entire contents of each of which are incorporated herein by reference. Related composites with multiple co-continuous phases may also include materials formed from immiscible block-copolymers. See Epps et al., "Network Phases In ABC Triblock Copolymers," Macromolecules, Vol. 37 (2004) 7085-7088 and Daoulas et al., "Fabrication Of Complex Three-Dimensional Nanostructures From Self-Assembling Block Copolymer Materials On Two-Dimensional Chemically Patterned Templates With Mismatched Symmetry," Physical Review Letters, Vol. 96 (2006) 036104; the entire contents of each of which are incorporated herein by reference. However, the above discussed composite structures do not provide for a composite structure with two interpenetrating phases where one phase maintains a truss-like 3D ordered microstructure derived from a 3D pattern of polymer optical waveguides.

As such, there is a need for a composite structure with two interpenetrating phases where one phase maintains a truss-like 3D ordered microstructure derived from a 3D pattern of polymer optical waveguides.

SUMMARY OF THE INVENTION

Aspects of embodiments of the present invention are directed towards a three-dimensional (3D) composite structure with two interpenetrating phases where one phase maintains a truss-like 3D ordered microstructure derived from a 3D pattern of polymer optical waveguides and a method of making the same.

An embodiment of the present provides a 3D composite structure (or materials) where at least one of the materials is or is derived from an ordered three-dimensional pattern of polymer optical waveguides and where the combination of multiple, yet distinguishable materials creates a new material system with bulk physical properties unlike the physical properties of its constitute materials. As envisioned, this composite structure according to one embodiment of the present invention has a continuous, interpenetrating network of at least two distinguishable materials where at least one of the materials maintains a truss-like 3D ordered microstructure. The materials may include any combination of a polymer, ceramic, carbon and/or metal.

More specifically, in an embodiment of the present invention, a three-dimensional composite material is provided. The three-dimensional material includes a three-dimensional ordered microstructure and a second continuous material. The three-dimensional ordered microstructure includes a plurality of first truss elements defined by a plurality of first self-propagating polymer waveguides and extending along a first direction, a plurality of second truss elements defined by a plurality of second self-propagating polymer waveguides and extending along a second direction, and a plurality of third truss elements defined by a plurality of third self-propagating polymer waveguides and extending along a third direction. The first, second, and third truss elements interpenetrate each other at a plurality of nodes to form a first continuous material with the three-dimensional ordered microstructure. The second continuous material has different physical properties than the first continuous material and shares an interface with the first continuous material, and wherein the interface is everywhere continuous.

In one embodiment, the three-dimensional material further includes a third continuous material having different physical properties than the second continuous material and sharing an interface with the second continuous material, and wherein the interface of the second and third continuous materials is everywhere continuous.

The first continuous material may include a first material selected from the group consisting of a polymer material, a carbon material, a metal material, and a ceramic material. The second continuous material may include a second material selected from the group consisting of a polymer material, a carbon material, a metal material, and a ceramic material. The third continuous material may include a third material selected from the group consisting of a polymer material, a carbon material, a metal material, and a ceramic material. Here, the polymer material may be a preceramic polymer selected from the group consisting of Starfire RD-633, Starfire SMP-10, Starfire SOC-A35, polysilazanes, polycarbosilanes, silicone resins, polysilanes, decaborane-based polymers, and combinations thereof. The metal material may include a material selected from the group consisting of nickel (Ni), copper (Cu), gold (Au), silver (Ag), ruthenium (Ru), platinum (Pt), rhodium (Rh), cobalt (Co), iron (Fe), zinc (Zn), niobium (Nb) and combinations thereof. The ceramic material may include a material selected from the group consisting of silicon carbide, silicon nitride, hafnium carbide, chromium carbide, boron nitride, boron carbide, aluminum oxide, titanium diboride, titanium nitride, zirconium dioxide, titanium carbide, titanium carbonitride, tantalum carbide, tantalum nitride, and combinations thereof, and combinations thereof.

In one embodiment, the polymer material is a thermoplastic material or a thermoset material.

In one embodiment, the first continuous material is substantially the same as the third continuous material.

According to another embodiment of the present invention, a method of forming a three-dimensional composite material is provided. The method includes: securing a volume of a photo-monomer; securing a mask between at least one collimated light source and the volume of the photo-monomer, the mask having a plurality of apertures; directing a collimated light beam from the at least one collimated light source to the mask for a period of exposure time such that a portion of the collimated light beam passes through the mask and is guided by the plurality of apertures into the photo-monomer to form a plurality of waveguides through a portion of the volume of the photo-monomer; removing any uncured photo-monomer to leave behind a three-dimensional ordered open-cellular microstructure to define an open volume and a structure of a first continuous material of the three-dimensional composite material; and placing a second continuous material in the open volume, wherein the second continuous material and the first continuous material share an interface between each other and have physical properties differing from each other, and wherein the interface is everywhere continuous.

In one embodiment, the method further includes placing a third continuous material with the second continuous material, wherein the third continuous material and the second continuous material share an interface between each other and have physical properties differing from each other, and wherein the interface between the third continuous material and the second continuous material is everywhere continuous.

The first continuous material may be formed from a first material selected from the group consisting of a polymer material, a carbon material, a metal material, and a ceramic material. The second continuous material may be formed from a second material selected from the group consisting of a polymer material, a carbon material, a metal material, and a ceramic material. The third continuous material may be formed from a third material selected from the group consisting of a polymer material, a carbon material, a metal material, and a ceramic material.

In one embodiment, the metal material is formed by coating at least one surface of the three-dimensional ordered open-cellular microstructure with an aqueous solution including a metal salt and reducing the aqueous solution on the at least one surface.

In one embodiment, the metal material is formed by electroplating and/or electroless plating of a metal selected from the group consisting of nickel (Ni), copper (Cu), gold (Au), silver (Ag), ruthenium (Ru), platinum (Pt), rhodium (Rh), cobalt (Co), iron (Fe), zinc (Zn), and combinations thereof.

In one embodiment, the ceramic material is formed by: coating the three-dimensional ordered open-cellular microstructure with a ceramic gelcasting solution; and polymerizing the ceramic gelcasting solution by adding a catalyst to the ceramic gelcasting solution such that the ceramic gelcasting solution is solidified, wherein the ceramic gelcasting solution includes a dispersed monomer; and removing the dispersed monomer by heating the coated three-dimensional ordered open-cellular microstructure.

In one embodiment, the ceramic material is formed by: forming a green body by filling the open volume of the three-dimensional ordered open-cellular microstructure with a ceramic slurry; and heating the green body to provide sintering and additional mechanical strength.

In one embodiment, the ceramic material is formed by: coating the three-dimensional ordered open-cellular microstructure with a solution including a preceramic polymer; and heating the coated three-dimensional ordered open-cellular microstructure in an inert environment.

In one embodiment, at least one of the first continuous material, the second continuous material, or the third continuous material is formed by performing chemical vapor deposition of a material selected from the group consisting of silicon carbide, silicon nitride, hafnium carbide, chromium carbide, boron nitride, boron carbide, aluminum oxide, titanium, titanium diboride, titanium nitride, zirconium dioxide, titanium carbide, titanium carbonitride, tantalum, tantalum carbide, tantalum nitride, nobelium, and combinations thereof.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, and not restrictive.

In the context of embodiments of the present invention, an ordered three-dimensional (3D) microstructure is referred to as an ordered 3D structure at the micrometer scale. An interface is referred as a boundary between two materials in physical contact, where the two materials may be suitably bounded (e.g., mechanically, electrically, or chemically bonded), and one side of the boundary is composed of the first material (or exclusively of the first material) and the other side of the boundary is composed of the second material (or exclusively of the second material). Also, sharing an interface is referred to as two materials that share an interface in which the characteristics of the interface in terms of mechanical, electrical, chemical, and thermal properties are substantially uniform regardless of where on the interface those properties are measured. That is, the interface is homogeneous (or substantially homogeneous).

In one embodiment of the present invention, a three-dimensional (3D) composite structure includes two interpenetrating phases where one phase maintains a truss-like 3D ordered microstructure derived from a 3D pattern of polymer optical waveguides.

An embodiment of the present provides a 3D composite structure (or materials) where at least one of the materials is or is derived from an ordered three-dimensional pattern of polymer optical waveguides and where the combination of multiple, yet distinguishable materials creates a new material system with bulk physical properties unlike the physical properties of its constitute materials. As envisioned, this composite structure according to one embodiment of the present invention has a continuous, interpenetrating network of at least two distinguishable materials where at least one of the materials maintains a truss-like 3D ordered microstructure. The materials may include any combination of a polymer, ceramic, carbon and/or metal.

Figure 1:
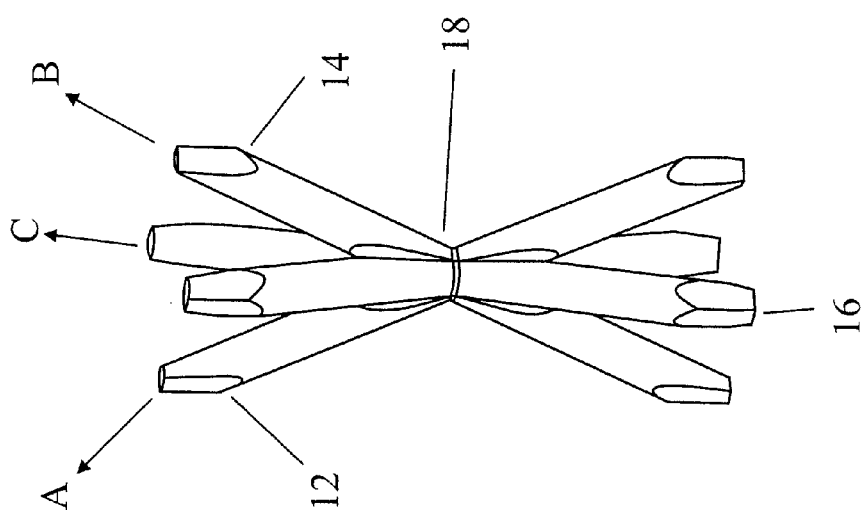
FIG. 1 is a perspective schematic view of a portion of a structure according to an embodiment of the present invention.
Figure 1:
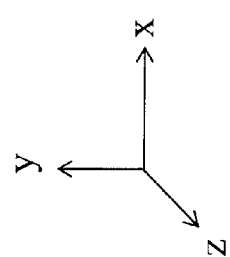
Figure 2:
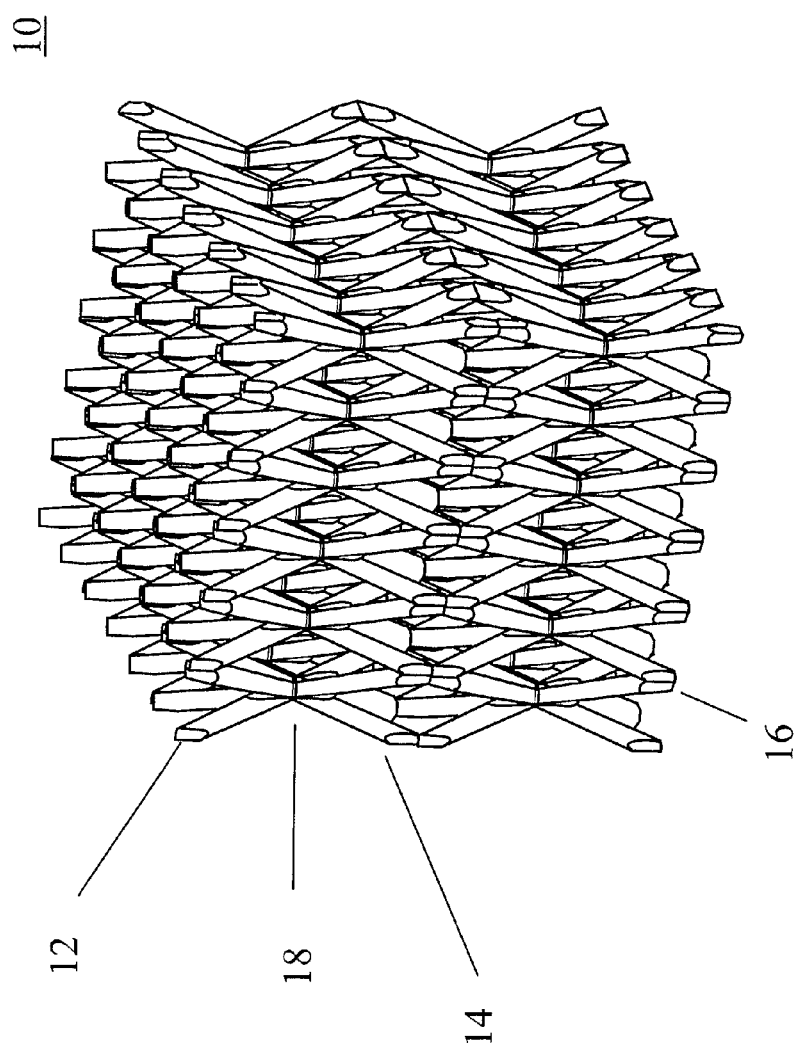
FIG. 2 is a perspective schematic view of a structure according to an embodiment of the present invention.

Referring to FIGS. 1 and 2, a three-dimensional ordered open-cellular microstructure 10 according to an embodiment of the present invention is a self-supporting structure. In one embodiment of the present invention, this three-dimensional ordered open-cellular microstructure 10 can be utilized as a 3D ordered microstructure to define (or derive) the final shape and dimensions of a three-dimensional composite material. The structure 10 includes first truss elements 12, second truss elements 14, and third truss elements 16. The first truss elements 12 are defined by first self-propagating polymer waveguides and extend along a first direction A. The second truss elements 14 are defined by second self-propagating polymer waveguides and extend along a second direction B. The third truss elements 16 are defined by third self-propagating polymer waveguides and extend along a third direction C. With reference to FIGS. 1 and 2, the truss elements 12, 14, 16 interpenetrate each other at nodes 18 to form a continuous material with a three-dimensional microstructure order.

In one embodiment, the truss elements 12, 14, 16 include a photo-polymer material. In one embodiment, the truss elements 12, 14, 16 are polymer optical waveguide truss elements.

In one embodiment, the continuous material is continuously formed such that it lacks any interior boundaries, e.g., boundaries within the interpenetrating portions of truss elements 12, 14, 16. In another embodiment, each node 18 of the structure 10 is formed of the continuous material.

According to one embodiment of the present invention, the structure 10 is formed by using a fixed light input (collimated UV light) to cure (polymerize) polymer optical waveguides, which can self-propagate in a 3D pattern. As such, the propagated polymer optical waveguides form the structure 10.

As disclosed in Monro et al. "Topical Review Catching Light In Its Own Trap," Journal Of Modern Optics, 2001, Vol. 48, No. 2, 191-238, which is incorporated by reference herein in its entirety, some liquid polymers, referred to as photopolymers, undergo a refractive index change during the polymerization process. The refractive index change can lead to a formation of polymer optical waveguides. If a monomer that is photo-sensitive is exposed to light (typically UV) under the right conditions, the initial area of polymerization, such as a small circular area, will "trap" the light and guide it to the tip of the polymerized region, further advancing that polymerized region. This process will continue, leading to the formation of a waveguide structure with approximately the same cross-sectional dimensions along its entire length.

According to one embodiment of the present invention, a mask with a two-dimensional pattern of apertures (see FIG. 3) is used to create a three-dimensional polymer microstructure.

Figure 3:
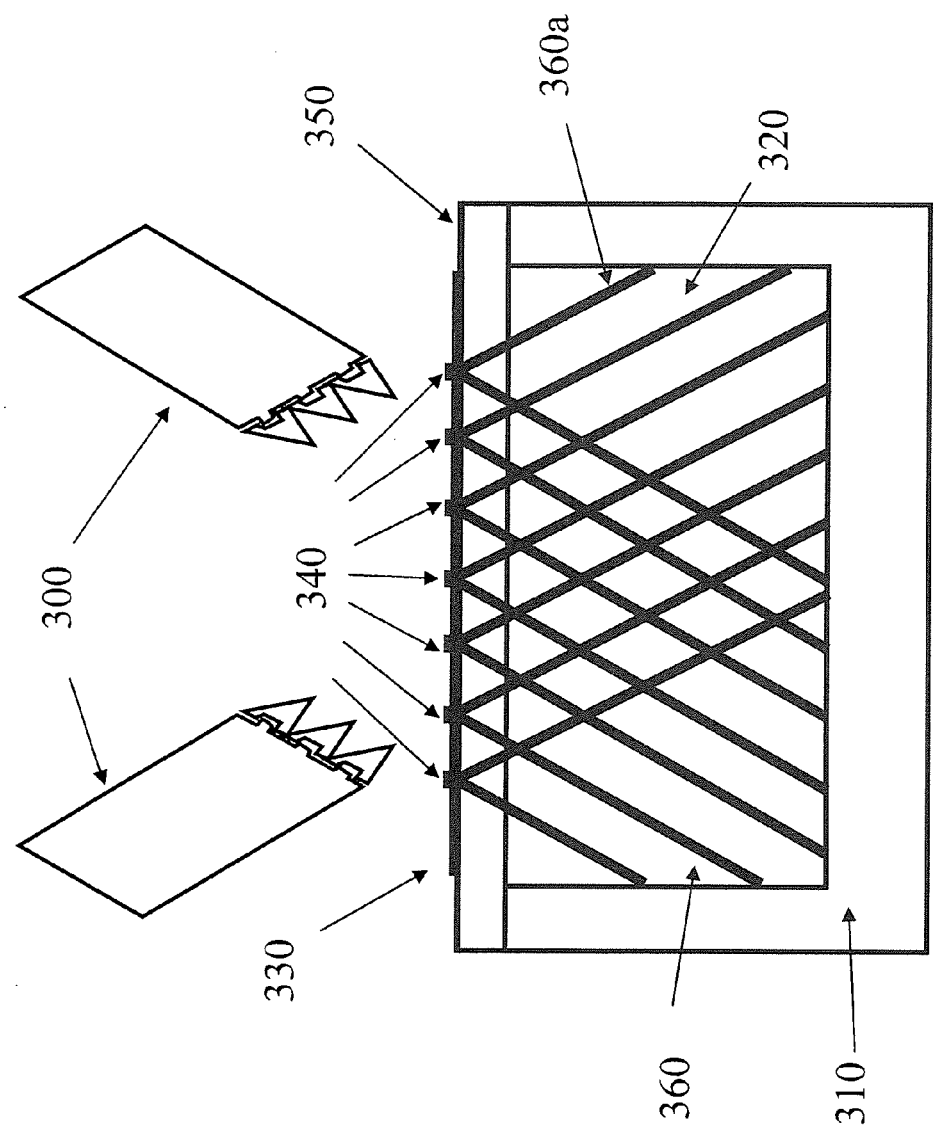
FIG. 3 is a schematic diagram of a system for forming a structure of an embodiment of the present invention from multiple waveguides created using a single collimated beam or multiple collimated beams through multiple apertures.
Figure 4B:
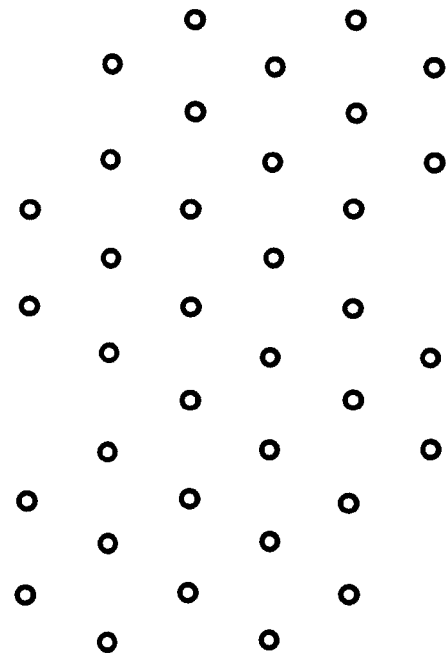
FIG. 4b illustrates an example of a hexagonal mask pattern (or a hexagonal mask aperture pattern) according to embodiments of the present invention.
Figure 4A:
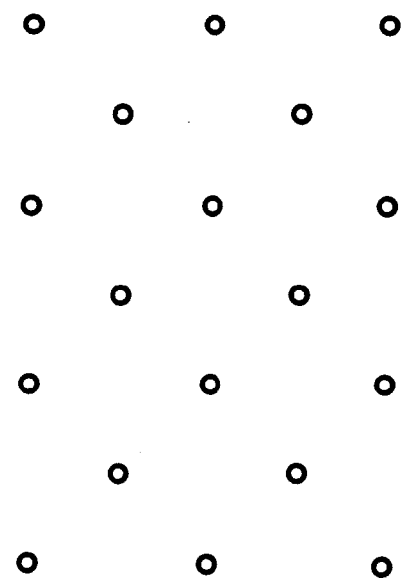
FIG. 4a illustrates an example of a square mask pattern (or a square mask aperture pattern) according to embodiments of the present invention.

With reference to FIG. 3, a system for forming a 3D polymer microstructure according to an embodiment of the present invention includes one or more collimated light sources 300, a reservoir (mold) 310 having a volume of monomer 320 that will polymerize at a wavelength of collimated light beams provided by the light sources 300, and a patterning apparatus, such as a mask 330 with multiple apertures (open areas) 340. Each of the apertures 340 has a given shape and dimension substantially matching a cross-section geometry of a waveguide (e.g., waveguide 360a). Between the mask 330 and the monomer 320, there may be a substrate 350. Here, in FIG. 3, a truly 3D network can be formed because the intersecting polymer waveguides 360 will simply polymerize together, but will not interfere with waveguide propagation. Also, the spacing between the plurality of waveguides 360 corresponds with the pattern of the plurality of apertures 340. The pattern of the apertures 340 may, for example, be in a square pattern as shown in FIG. 4a and/or in a hexagonal pattern as shown in FIG. 4b. The hole (aperture) spacing, i.e., distance between apertures 340 in the mask 330, and the number of waveguides 360 formed from each of the apertures 340 will determine the open volume fraction (i.e. open space) of the formed 3D microstructure.

As such, through the system of FIG. 3, a 3D microstructure (or a 3D ordered polymer microstructure) of an embodiment of the present invention can be designed for a given application. The design parameters include: 1) the angle and pattern of the polymer waveguides with respect to one another, 2) the packing, or relative density of the resulting cellular structure (or the open volume fraction), and 3) the cross-sectional shape and dimensions of the polymer waveguides.

Figure 5:
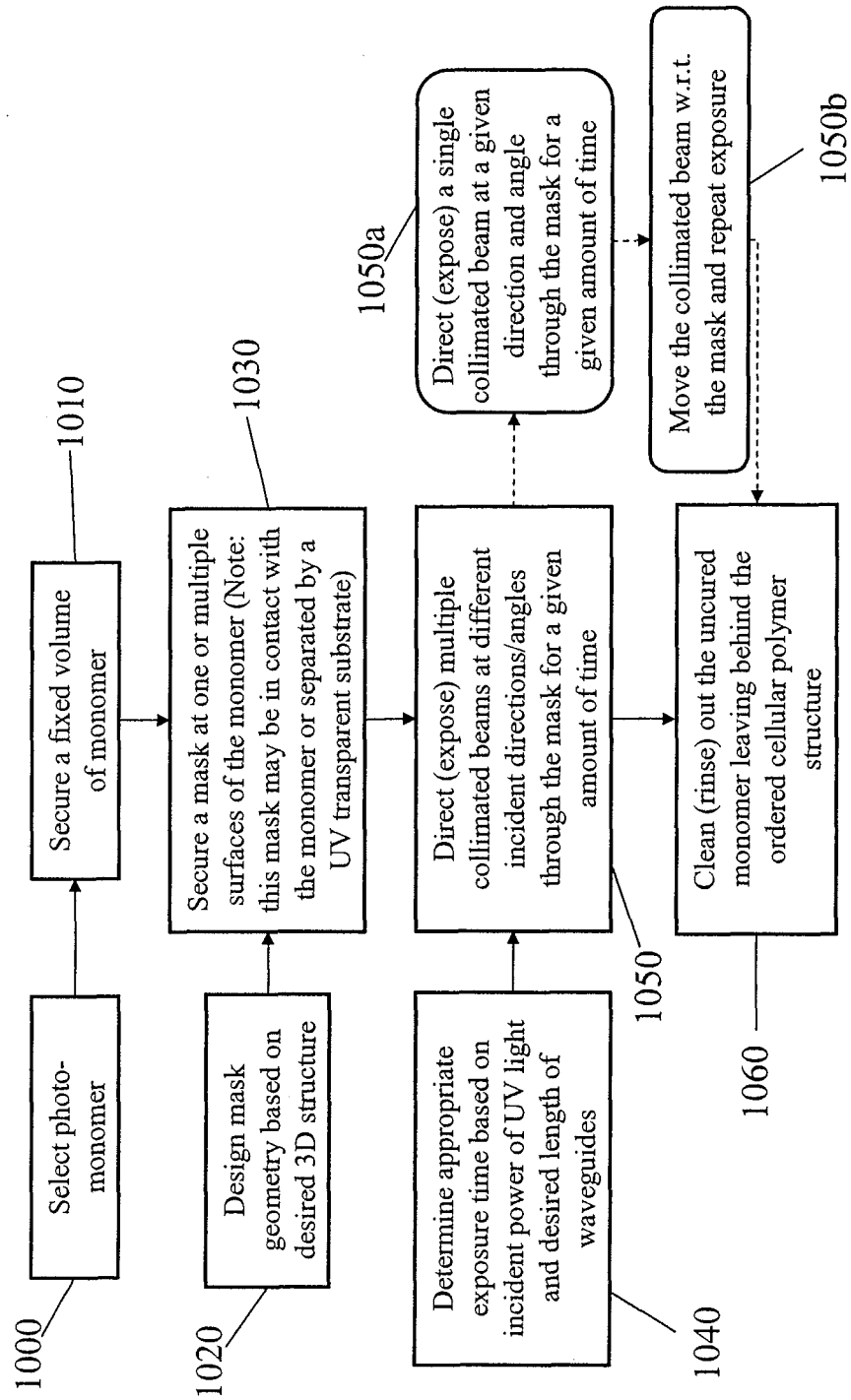
FIG. 5 is a process flow diagram for forming one or more polymer waveguides of a structure according to an embodiment of the present invention.

In more detail, FIG. 5 shows a method of forming a 3D ordered microstructure according to an embodiment of the present invention. As illustrated in FIG. 5, a photo-monomer is selected in block 1000. In block 1010, a volume of the selected photo-monomer is secured (e.g., in a reservoir). A mask geometry is designed based on a desired 3D structure in block 1020. A patterning apparatus, such as a mask having the designed geometry, is secured in block 1030. Here, the secured mask has at least one aperture between at least one collimated light source and the volume of the selected photo-monomer. In addition, the mask may be in contact with the monomer or separated by a substrate (e.g., by a UV transparent substrate).

In block 1040, an appropriate exposure time is determined based on incident power of a collimated light beam from the at least one collimated light source (e.g., an incident power of a UV light) and a desired length of one or more waveguides. The collimated light beam from the at least one collimated light source is directed to the mask for a period of exposure time so that a portion of the collimated beam passes through the mask and is guided by the at least one aperture into the photo-monomer to form at least one waveguide through a portion of the volume of the photo-monomer. Here, the at least one waveguide has a cross-sectional geometry substantially matching the designed aperture geometry on the mask.

In one embodiment as shown in block 1050, multiple collimated beams at different incident directions and/or angles are directed through the mask for a given amount of time.

Alternatively, as shown in blocks 1050a, a single collimated beam at a given direction and angle is directed through the mask for a given amount of time. Then, at block 1050b, the collimated light beam is moved with respect to the mask and the exposure is repeated.

Then, at block 1060, any uncured photo-monomer is removed to leave behind a 3D ordered polymer microstructure. Here, in one embodiment, the plurality of polymer waveguides are used to form the 3D ordered polymer microstructure, and the 3D ordered polymer microstructure corresponds with the pattern of the plurality of apertures.

The resulting 3D polymer microstructure can be formed in seconds in the area where exposed to the incident collimated beam. Since the incident light and the monomer remain fixed with respect to one another during the formation of a polymer waveguide, the exposure area of the collimated beam(s) can be scanned over a larger surface area of monomer, leading to the formation of large-area structures. Alternatively, in one embodiment, a volume of monomer can continuously be fed under a fixed incident light pattern (created from a mask and collimated light) leading to a path for mass production.

As described, once the polymer cellular structure is formed in the volume of monomer, the remaining un-polymerized material (monomer) is removed leaving an open cellular polymer material that is the ordered 3D microstructure. By way of example, a solvent that dissolves the monomer (but not the polymer) may be used to aid in the monomer removal.

With reference back to FIGS. 1 and 2, the truss elements 12, 14, 16 of the structure 10 define an open volume (i.e. free space) of the structure 10. In one embodiment, the structure 10 defines a free space of not less than about 40% by volume and not greater than about 99% by volume. In another embodiment, the structure 10 defines a free space of not less than about 70% by volume and not greater than about 95% by volume.

The truss elements 12, 14, 16 intersect at the nodes 18 to form symmetrical angles in three dimensions (three orthogonal directions). The symmetrical angles relative to the xz-plane (see, FIG. 1), can measure between 0° and 90°. That is, truss elements 12, 14, 16 interpenetrate each other to form "perfect" nodes: each of the truss elements 12, 14, 16 defines an angle relative to a compression surface of the structure 10 (e.g. a surface extending along a direction of the xz-plane), and the respective angles defined by the truss elements 12, 14, 16 are substantially equal to one another. However, embodiments of the present invention are not limited thereto.

The truss elements 12, 14, 16 have an intrinsically high strength due to their small scale. In one embodiment, each of the truss elements 12, 14, 16 has an axial diameter of not greater than about 500 μm.

In another embodiment, each of the truss elements 12, 14, 16 has an axial diameter of not greater than about 200 μm. In another embodiment, each of the truss elements 12, 14, 16 has an axial diameter of not greater than about 1 μm. The truss elements 12, 14, 16 are configured to have a correspondingly small aspect ratio (e.g., length/diameter ratio) for withstanding a bending moment. Here, each of the truss elements 12, 14, 16 has a length not greater than 100 μm such that the truss elements can better withstand a mechanical load applied to the structure 10. As such, the truss elements 12, 14, 16 experience little, if any, bending deformation during application of the mechanical load to the structure 10.

At certain size scales (e.g., the size scales described above), the strength of the truss elements is increased, which corresponds to an increased strength of the structure 10. In one embodiment, each of the truss elements 12, 14, 16 has molecular alignment extending along an axial direction of the truss element. As such, an anisotropic material is produced, which provides a substantial degree of stiffness and/or strength along the axial direction. In one embodiment, in a material that is composed of long molecular chains (e.g., polymers), the molecules thereof can be aligned along a direction to provide an increased degree of mechanical strength and/or stiffness along the alignment direction. In more detail, where the molecular alignments of the truss elements 12, 14, 16 extend along the corresponding axial directions, the truss elements 12, 14, 16 are configured to axially transfer a mechanical load applied to the structure 10.

As described above, the structure 10 withstands the mechanical load, e.g., via axial tension and compression of the truss elements 12, 14, 16. Molecular alignment of the truss elements 12, 14, 16 along their respective axial directions lends additional strength and/or stiffness to the truss elements 12, 14, 16 and, accordingly, also to the structure 10.

In one embodiment, the truss elements 12, 14, 16 are configured to provide the structure 10 with a stretch-dominated behavior under a compression load applied to the structure 10. Such stretch-dominated behavior is contrasted from the bending-dominated behavior (e.g. of randomly oriented cellular structures), as described in Ashby, "The Properties Of Foam And Lattices," Philosophical Transactions—Royal Society Of London Series A Mathematical Physical And Engineering Sciences, Vol. 364, 2006, which is incorporated by reference herein in its entirety.

In a bending-dominated structure, the elastic modulus is proportional to the square of the relative density $\rho'/\beta_s'$, where $\rho'$ is the density of the cellular material and $\rho_s'$ is the density of the solid from which it is constructed. In contrast, a stretch-dominated structure (such as structure 10), has a compressive elastic modulus (E) directly proportional to both the relative density thereof and the modulus ($E_s$) of the solid material portion of the structure 10, as expressed in equation (1) below:

$$E = E_s(\sin^4\theta)(\rho/\rho_s) \quad (1)$$

where $\rho$ is a density of the structure 10, $\rho_s$ is a density of a solid material portion of the structure 10, $\theta$ is an angle of at least one of the truss elements 12, 14, 16 relative to a compression surface of the structure 10, and $E_s$ is a modulus of the solid material portion of the structure 10. As such, the elastic modulus of a structure of embodiments of the present invention is also proportional to a geometric function of the angle $\theta$ of the structure, and $\theta$ can accordingly be chosen to vary (e.g., increase or reduce) the elastic modulus.

Figure 6:
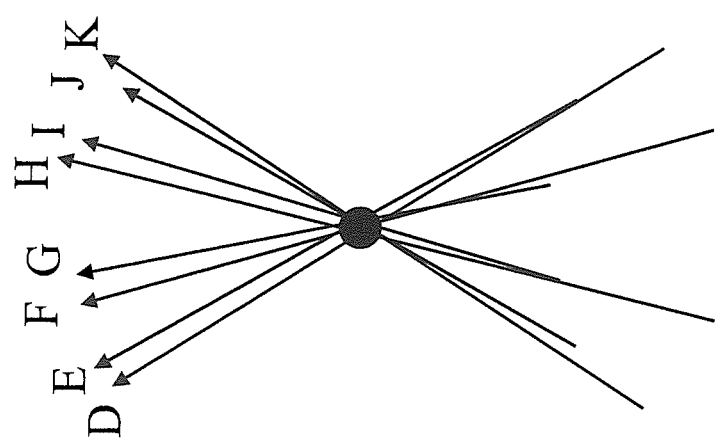
FIG. 6 is a perspective schematic view showing respective directions along which truss elements of a structure of an embodiment of the present invention extend.

With reference back to FIGS. 1 and 2, the structure 10 includes truss elements 12, 14, 16 respectively extending along A, B, and C directions. However, embodiments of the present invention are not limited thereto. For example, with reference to FIG. 6, a structure of an embodiment of the present invention may include truss elements defined by self-propagating polymer waveguides and extending along D, E, F, G, H, I, J and K directions, respectively. For example, a structure according to an embodiment of the present invention may include eight truss elements, each of which extends along a corresponding one of eight varying directions. Here, similar to the embodiment shown in FIGS. 1 and 2, the eight truss elements interpenetrate each to form nodes of a continuous material with a three-dimensional microstructure order. However, embodiments of the present invention are not limited thereto, and may include more or fewer than eight truss elements.

In a further embodiment of the present invention, an open volume of a cellular structure is filled at least partially with a material different from the material of the cellular structure itself, thereby creating an ordered bi-phase composite. Also in a further embodiment of the present invention, one or more truss elements of a cellular structure are coated with a material different from the material of the cellular structural itself to adjust the thermal behavior thereof. Also in a further embodiment of the present invention, base elements of a cellular structure are coated with a material different from the material of the cellular structural itself, and the base elements are removed to create a self-supporting structure having continuous but separated volumes.

The size scale and the features of structures of embodiments of the present invention can be utilized in heat transfer applications.

In one embodiment of this invention, an apparatus for storing thermal energy includes (or is fabricated with) a three-dimensional ordered open-cellular microstructure as a polymer scaffold. The geometry for the polymer scaffold according to an embodiment of the present invention is shown in FIG. 2 as described above. Here, in one embodiment, the truss elements (or rods) 12, 14, 16 that make up the structure (or scaffold) 10 ranges from about 1 m to about 0.5 mm (from 10 µm to 0.5 mm) in diameter. While the truss elements 12, 14, 16 for the scaffold 10 in FIG. 2 are shown to be interpenetrating, the present invention is not thereby limited. For example, the truss elements (or rods) could all be parallel as well. Once the structure 10 is formed, it can be made into a heat exchanger or heat storage composite as described in more detail below.

One embodiment of the present invention provides a three-dimensional composite material where at least one of the materials is or is derived from an ordered three-dimensional pattern of polymer optical waveguides and where the combination of multiple, yet distinguishable materials creates a new material system with bulk physical properties unlike the physical properties of its constitute materials.

As envisioned, this composite structure according to an embodiment of the present invention has a continuous, interpenetrating network of at least two distinguishable materials where at least one of the materials maintains a truss-like ordered microstructure. The materials may include any combination of a polymer, ceramic, carbon and/or metal.

In one embodiment, the purpose of this composite structure is to enable material systems with unique property combinations, which could include the following, electrically conductive/thermally insulating, lightweight/high velocity impact absorption, lightweight/low velocity impact absorption, tunable acoustic properties for acoustic filters, tunable dielectric properties, three-dimensional meta-structures for radio frequency (RF) filters, tailorable surface area and pore diameter/chemically functional filter/separations unit, thermally conductive/high hardness/high toughness (ductile), lightweight/wear resistant/high toughness, photonic band gap materials, etc.

In one embodiment, this composite structure can have a wide-range of applications, depending on the materials used. Given the mechanical efficiency, composites formed with this structure can provide an increase in load carrying capacity while also enhancing other physical properties as described in the section above. These multifunctional structures can be tailored to meet specific application requirements in areas such as lightweight energy absorbing structures, thermal management materials for automotive and aerospace systems, acoustic filters for noise reduction systems and soundproofing, 3-dimensional meta-structures for RF filtering and signal manipulation, heat dissipating armor plate, etc.

One embodiment of the present invention provides a composite structure with at least two distinguishable material phases where one of the phases is or is derived from an ordered three-dimensional interconnected pattern of polymer optical waveguides as described above with reference to FIGS. 1 to 6. That is, ordered polymer structures, as described with reference to FIGS. 1 to 6, can have a three-dimensional truss-like architecture, and given that these polymer structures are open cellular, a variety of suitable processing techniques can be used to create a composite structure with at least two continuous interpenetrating phases where one phase of the composite maintains the 3D truss-like architecture.

Figure 7:
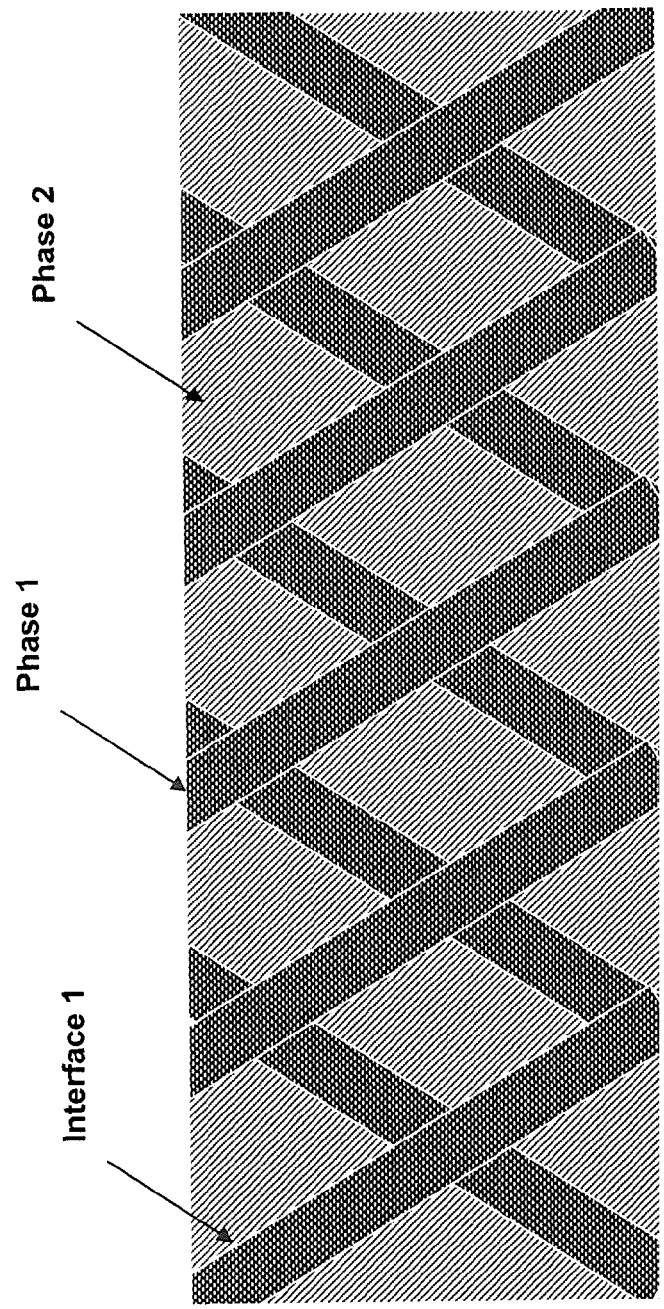
FIG. 7 is a cross-sectional schematic view of a composite structure with two interpenetrating phases where one phase is or is derived from an open cellular polymer structure (e.g., the structure of FIG. 2) pursuant to an embodiment of the present invention.
Figure 9:
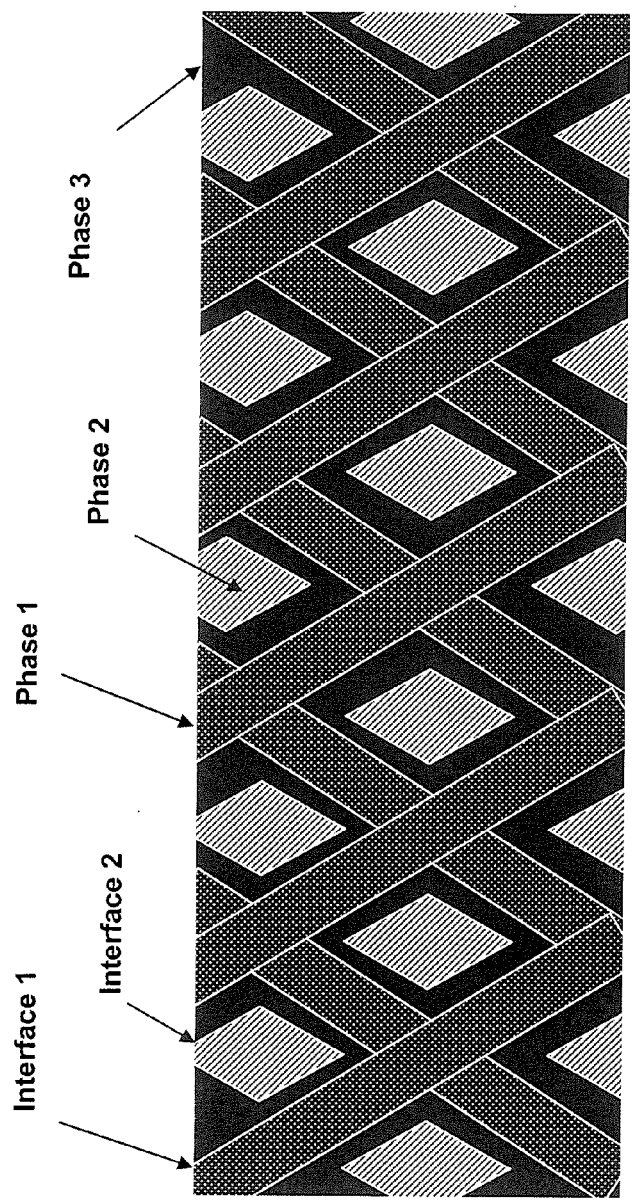
FIG. 9 is a cross-section schematic view of a composite structure with three interpenetrating phases where one phase is or is derived from an open cellular polymer structure (e.g., the structure of FIG. 2) pursuant to an embodiment of the present invention.

In one embodiment of the present invention, the two distinct materials for a two phase composite structure (that form the structure) share a common interface as shown by Interface 1 in FIG. 7. For a three phase composite structure as shown in FIG. 9, there are two separate interfaces, as shown by Interface 1 and Interface 2 in FIG. 9. In one embodiment of the present invention, this relationship between distinct material phases and interfaces can be extended if more material phases are present in the composite structure, and the present invention is not thereby limited. In the one embodiment of the present invention, these interfaces define a bond between two material phases, though a bond is not required.

Each of the material phases can be a polymer, metal, ceramic, carbon, intermetallic, air (no material present), or any suitable combinations thereof. To create these new composite material structures from the original ordered three-dimensional interconnected pattern of polymer optical waveguides as described above with reference to FIGS. 1 to 6, a number of processing methods are listed below that can be used to create composite structures according to embodiment of the present invention from the aforementioned materials. That is, the following exemplary methods illustrate the present invention in more detail. However, the present invention is not limited by these methods.

Polymer

The open volume of the original polymer structure can be filled with a dissimilar polymer, which could be either be a liquid monomer (precursor) that is cured in place (e.g., to form a thermoset and/or thermoplastic polymer) or a thermoplastic polymer that is melted in. Various suitable techniques to infuse a liquid monomer or polymer into a porous medium exist: these include resin transfer molding (RTM), resin infusing molding (RIF), among others, and can be used for both thermoset and thermoplastic polymers. To obtain a polymer reverse mold of the original polymer structure, the polymer used to fill in the open volume could be resistant to solvents that would dissolve the original polymer structure.

Carbon/Graphite

The original polymer structure can be heated above 900° C. (carbonized) in an inert atmosphere (e.g. nitrogen, argon, etc.) to remove hydrogen, nitrogen, and oxygen that is present in the polymer chains. The yield (remaining mass % of the original polymer structure) after the carbonization process is highly dependent on the chemical structure of the original polymer and the processing/heating parameters. To increase the carbon yield in the original polymer structure, higher carbon yielding monomers, such as acrylonitrile, can be incorporated into the original polymer creating a higher carbon yielding co-polymer. The details to create a high yielding carbon structure are described in Jacobsen, "Ordered Open-Cellular Carbon Microstructure And Method Of Making Same," U.S. patent application Ser. No. 11/870,379, filed Oct. 9, 2007; the entire content of which is incorporated herein by reference.

Metals

Metal Salt Reduction

An aqueous solution (dilute) of a metal salt (e.g., gold, nickel, silver, etc.) is made. The aqueous phase is then reduced with a reducing agent (metal ion to metal (e.g., Au(III)→Au(0)) to form metal nanoparticles that will coat the surface of the polymer through heterogeneous nucleation.

Electro/Electroless Plating

Metal deposition can be accomplished via electroplating, electroless plating, or a combination of these two methods. Proceeding directly from the original polymer structure, electroless plating can be used to create a metallic phase around the polymer. Various metals can be used with this technique including nickel, copper, ruthenium, etc.

Electroplating of a carbon structure can be accomplished due to its conductive nature. As with electroless plating, electroplating the truss will form a tubular metal version of the structure depicted in FIG. 2. In one embodiment of the present invention, the electroplating approach is utilized over electroless plating because it can be adapted to nearly any transition metal on the periodic table.

Referring to FIG. 7, if any of the electro/electroless plating techniques are carried out for a long enough period of time, the open volume of the original polymer structure can be completely filled with the plating metal creating a solid metallic Phase 2. Furthermore, the formation of a metallic Phase 2 is particularly useful in the creation of an inverse truss template structure. After filling the void space with a metal, the original polymer can be removed via high temperature oxidation or with the appropriate solvent without destroying the metallic phase. The resulting metallic inverse truss structure can then be backfilled with a variety of different phases (e.g. ceramics), allowing for the creation of a wide variety of composite structures.

Metal Casting

Referring to FIG. 7, the final possibility for forming a metallic truss involves the direct infusion of molten metal into an inverse truss structure, i.e. a structure wherein Phase 1 is air and Phase 2 is composed of any refractory metal or ceramic with a melting temperature higher than that of the metal to be infused. The molten metal can either be allowed to "wet" into the structure due to surface tension, or if necessary it can be forced in using a hot isostatic press (e.g. squeeze casting).

Ceramics

There are a variety of techniques to obtain one or multiple ceramic phases. To form these ceramic phase(s), a polymer, carbon/graphite, or metal structure formed from the above methods are used to create an ordered three-dimensional interconnected composite structure where at least one of the phase is a ceramic.

Gel Casting

Referring to FIG. 7, to create a ceramic matrix (Phase 2) that contains the original truss structure, the truss structure (which is not a polymer according to one embodiment) is immersed into a mold containing a ceramic gelcasting solution. In this embodiment, the gelcasting solution is composed of a dispersed monomer (i.e. methacryamide) in combination with a high volume percent (>50%) of a selected ceramic powder. Once the solution has interpenetrated the truss structure, the monomer-based solution is polymerized through addition of a catalyst to form a solid ceramic gel. The resulting structure is removed from the mold after drying. At this stage, the structure may have the desired physical properties and considered to be in final form. However, further heating at elevated temperature (>350° C.) in an oxidizing atmosphere may be used to further remove the organic constituent (polymer), leaving a two-phase structure that is composed of the truss phase interpenetrated and encapsulated by a slightly porous ceramic phase. Further densification may be achieved by heating the structure to the appropriate temperature for sintering of the ceramic particles (typically >1000° C.). The densification process results in a limited amount of shrinkage of the bulk dimensions, providing a compressive force on the truss structural phase that may possibly increase the modulus and/or toughness of the composite material.

Slip Casting

Through a method referred to as slip casting, the open volume of the original polymer structure is infiltrated with a high volume loaded ceramic slurry (in one embodiment, containing nano-micron sized ceramic particles that are electrostatically or sterically stabilized). The ceramic slurry forms a green body (high density (>~50%), and the green body is then fired to provide sintering and mechanical strength. Depending on whether there is a need for the polymer to remain or not, the formed structure can be heat treated to temperatures below or above the decomposition temperature of the polymer.

Sol-Gel

To create a ceramic phase through sol-gel processing, the original polymer structure is infiltrated with a low molecular weight and low organic component sol-gel precursor (silica, silicon-oxycarbide or silicon-oxynitride). After infiltration, a mild burnout is done to pyrolyze the carbonaceous species (T<300 C) and form a thin ceramic layer on the polymer (multiple coatings could be used to build up thickness). Alternatively, a sol-gel glass could be used to coat the interior pores of the original polymer structure. Following the glass formation and densification, a second phase could be added within the remaining pores that could have a solid state reaction with the second phase giving a triphasic material, or a glass could be made and densified. Due to the high-temperature stability of the sol-gel ceramic, the polymer could be burned out leaving a negative pore space that is subsequently filled with other materials.

Chemical Vapor Deposition

The original polymer structure is placed in an evacuated chamber, and the structure is heated to at least 100° C. and then a vapor of a chemical precursor is introduced. When the vapor comes into contact with the heated sample, it decomposes and forms a ceramic coating. Ceramics such as silicon carbide, silicon nitride, hafnium carbide, chromium carbide, boron nitride, boron carbide, aluminum oxide, titanium diboride, titanium nitride, zirconium dioxide, titanium carbide, titanium carbonitride, tantalum carbide, tantalum nitride, and combinations thereof may be deposited. That is, the ceramics can be formed via chemical vapor deposition, chemical vapor infiltration, plasma enhanced chemical vapor deposition, and/or other gas phase deposition technique, and the ceramics can result by the precursor solidifying or decomposing on the surface of the original polymer structure.

Carbide Reactions

To form a ceramic through reaction, a carbon/graphite or metal structure is reacted with a molecule in the liquid or gas phase, usually at elevated temperature. The original structure (carbon or metal in this case) may be completely transformed into a ceramic, or if a less than stoichiometric amount of reactant is used, the structure can have a core of the original material surrounded by a ceramic overcoat. Carbides such as SiC, HfC, Cr3C2 or oxides such as $Al_2O_3$ and $ZrO_2$ may be formed in this manner.

Preceramic Polymers

Preceramic polymers may be infiltrated into the open volume of different starting structures, such as the original polymer structure, or a metal or a carbon structure formed through the methods described above. The polymer can be applied by dipping the starting structure into a dilute or neat solution of preceramic polymers and then heating the coated structure under inert atmosphere. Ceramics such as SiC, SiOC, $SiO_2$, and $Si_3N_4$, and boron carbides may be deposited. Examples of applicable preceramic polymers are Starfire RD-633, Starfire SMP-10, Starfire SOC-A35, Clariant/KiON Ceraset 20 (polysilazanes), polycarbosilanes, silicone resins, polysilanes, and decaborane based polymers and monomers.

These above described exemplary methods to form various material phases of the disclosed composite structures are not meant to cover all possible methods, but rather describe some of the methods that can be used to form the composite structures with ordered three-dimensional interpenetrating phase from the original polymer structures created from patterning polymer optical waveguides.

Figure 8:
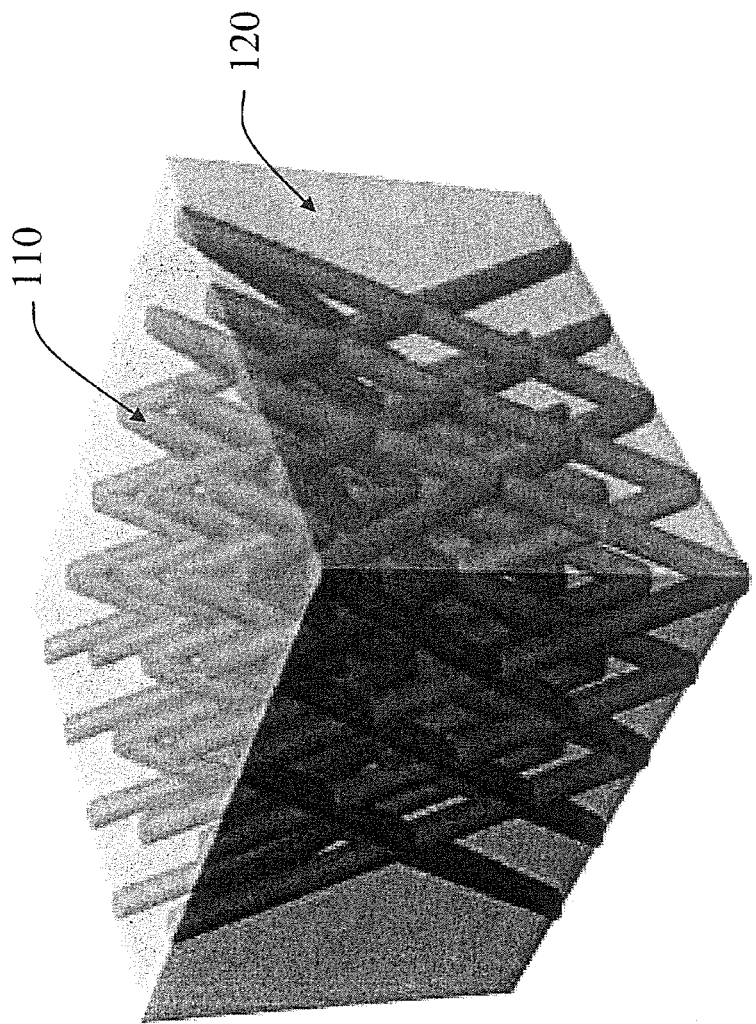
FIG. 8 is a three-dimensional schematic view of the composite structure of FIG. 7.

Referring back to FIG. 8, a three-dimensional composite material 100 according to an embodiment of the present invention is shown. Here, the three-dimensional composite material 100 includes a three-dimensional ordered microstructure 110 and a second continuous material 120. The three-dimensional ordered microstructure 110 includes a plurality of first truss elements defined by a plurality of first self-propagating polymer waveguides and extending along a first direction, a plurality of second truss elements defined by a plurality of second self-propagating polymer waveguides and extending along a second direction, and a plurality of third truss elements defined by a plurality of third self-propagating polymer waveguides and extending along a third direction. The first, second, and third truss elements interpenetrate each other at a plurality of nodes to form a first continuous material with the three-dimensional ordered microstructure 110. The three-dimensional ordered microstructure 110 is self-supporting. In addition, the second continuous material 120 has different physical properties than the first continuous material and shares an interface with the three-dimensional ordered microstructure 110.

The second continuous material 120 may include a polymer having different physical properties with respect to that of the first, second, and third self-propagating polymer waveguides. The polymer may include a thermoset and/or thermoplastic polymer.

The second continuous material 120 may include carbon.

The second continuous material 120 may include metal nanoparticles.

The second continuous material 120 may include one or more metal layers. The one or more metal layers may include a material selected from the group consisting of nickel (Ni), copper (Cu), gold (Au), silver (Ag), ruthenium (Ru), platinum (Pt), rhodium (Rh), cobalt (Co), iron (Fe), zinc (Zn), and combinations thereof. The open volume may be substantially occupied by the one or more metal layers.

The second continuous material 120 may include a ceramic material. The ceramic material may include a material selected from the group consisting of silicon carbide, silicon nitride, hafnium carbide, chromium carbide, boron nitride, boron carbide, aluminum oxide, titanium diboride, titanium nitride, zirconium dioxide, titanium carbide, titanium carbonitride, tantalum carbide, tantalum nitride, and combinations thereof.

The second continuous material 120 may include a preceramic polymer. The preceramic polymer may include a material selected from the group consisting of Starfire RD-633, Starfire SMP-10, Starfire SOC-A35, polysilazanes, polycarbosilanes, silicone resins, polysilanes, decaborane-based polymers, and combinations thereof.

According to another embodiment of the present invention, a three-dimensional composite material is provided (e.g., FIGS. 7 and 9). The three-dimensional material includes a three-dimensional ordered microstructure and a second continuous material. The three-dimensional ordered microstructure includes a plurality of first truss elements defined by a plurality of first self-propagating polymer waveguides and extending along a first direction, a plurality of second truss elements defined by a plurality of second self-propagating polymer waveguides and extending along a second direction, and a plurality of third truss elements defined by a plurality of third self-propagating polymer waveguides and extending along a third direction. The first, second, and third truss elements interpenetrate each other at a plurality of nodes to form a first continuous material (e.g., Phase 1, Phase 2 in FIG. 7) with the three-dimensional ordered microstructure. The second continuous material has different physical properties than the first continuous material and shares an interface (e.g., Interface 1 in FIG. 7) with the first continuous material, and wherein the interface is everywhere continuous.

In one embodiment, the three-dimensional material further includes a third continuous material (e.g., Phase 1, Phase 2, Phase 3 in FIG. 9) having different physical properties than the second continuous material and sharing an interface (e.g., Interface 1, Interface 2 in FIG. 9) with the second continuous material, and wherein the interface of the second and third continuous materials is also everywhere continuous.

The first continuous material may include a first material selected from the group consisting of a polymer material, a carbon material, a metal material, and a ceramic material. The second continuous material may include a second material selected from the group consisting of a polymer material, a carbon material, a metal material, and a ceramic material. The third continuous material may include a third material selected from the group consisting of a polymer material, a carbon material, a metal material, and a ceramic material. Here, the polymer material may be a preceramic polymer selected from the group consisting of Starfire RD-633, Starfire SMP-10, Starfire SOC-A35, polysilazanes, polycarbosilanes, silicone resins, polysilanes, decaborane-based polymers, and combinations thereof. The metal material may include a material selected from the group consisting of nickel (Ni), copper (Cu), gold (Au), silver (Ag), ruthenium (Ru), platinum (Pt), rhodium (Rh), cobalt (Co), iron (Fe), zinc (Zn), niobium (Nb) and combinations thereof. The ceramic material may include a material selected from the group consisting of silicon carbide, silicon nitride, hafnium carbide, chromium carbide, boron nitride, boron carbide, aluminum oxide, titanium diboride, titanium nitride, zirconium dioxide, titanium carbide, titanium carbonitride, tantalum carbide, tantalum nitride, and combinations thereof, and combinations thereof.

In one embodiment, the polymer material is a thermoplastic material or a thermoset material.

In one embodiment, the first continuous material is substantially the same as the third continuous material.

Figure 10:
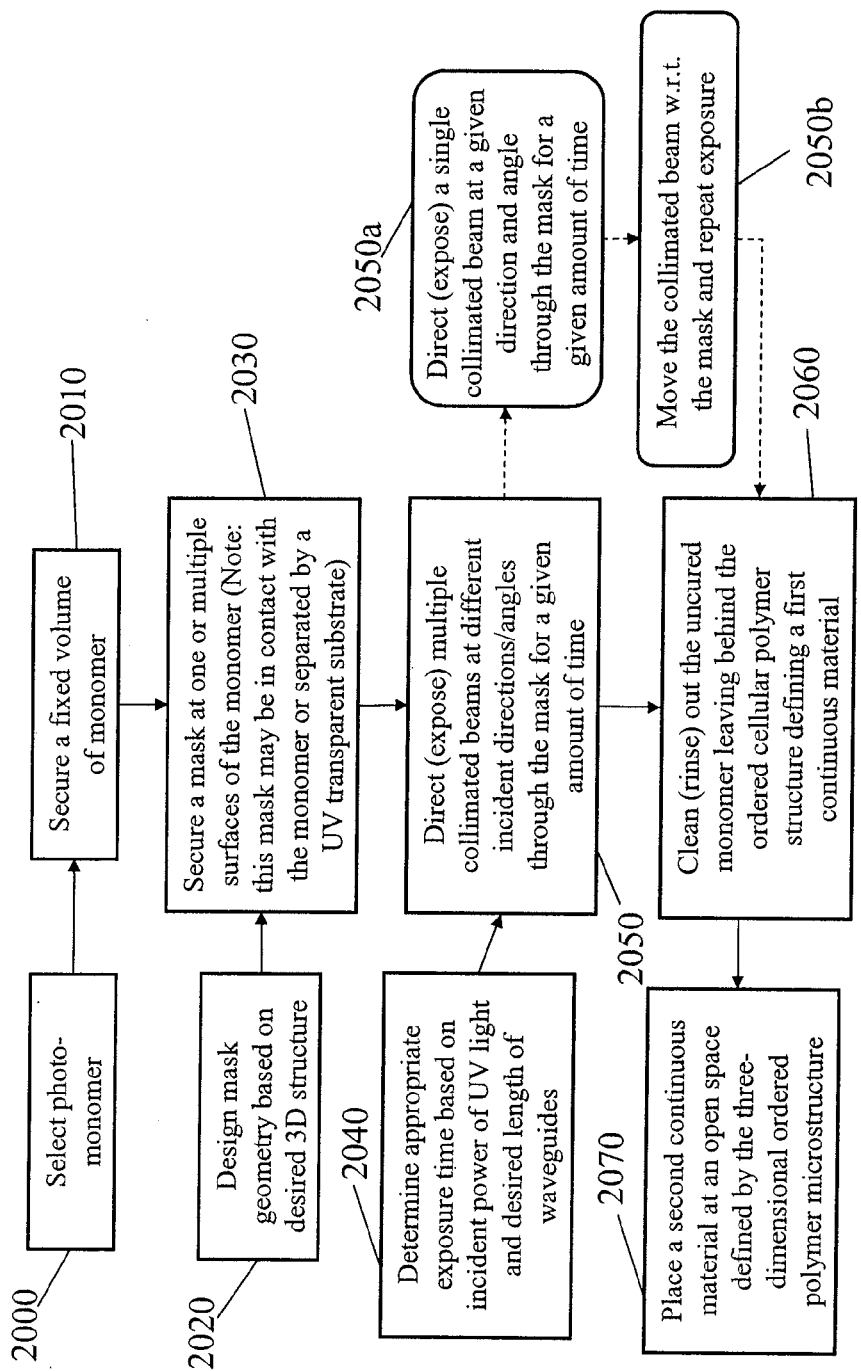
FIG. 10 is a process flow diagram for forming a three-dimensional composite material according to an embodiment of the present invention.

FIG. 10 shows a method of forming a three-dimensional composite material according to an embodiment of the present invention. As illustrated in FIG. 10, a photo-monomer is selected in block 2000. In block 2010, a volume of the selected photo-monomer is secured (e.g., in a reservoir). A mask geometry is designed based on a desired 3D structure in block 2020. A patterning apparatus, such as a mask having the designed geometry, is secured in block 2030. Here, the secured mask has at least one aperture between at least one collimated light source and the volume of the selected photo-monomer. In addition, the mask may be in contact with the monomer or separated by a substrate (e.g., by a UV transparent substrate).

In block 2040, an appropriate exposure time is determined based on incident power of a collimated light beam from the at least one collimated light source (e.g., an incident power of a UV light) and a desired length of one or more waveguides. The collimated light beam from the at least one collimated light source is directed to the mask for a period of exposure time so that a portion of the collimated beam passes through the mask and is guided by the at least one aperture into the photo-monomer to form at least one waveguide through a portion of the volume of the photo-monomer. Here, the at least one waveguide has a cross-sectional geometry substantially matching the designed aperture geometry on the mask.

In one embodiment as shown in block 2050, multiple collimated beams at different incident directions and/or angles are directed through the mask for a given amount of time.

Alternatively, as shown in blocks 2050*a*, a single collimated beam at a given direction and angle is directed through the mask for a given amount of time. Then, at block 2050*b*, the collimated light beam is moved with respect to the mask and the exposure is repeated.

At block 2060, any uncured photo-monomer is removed to leave behind a 3D ordered polymer microstructure. The plurality of polymer waveguides are used to form the 3D ordered polymer microstructure, and the 3D ordered polymer microstructure corresponds with the pattern of the plurality of apertures. Here, in one embodiment of the present invention, the 3D ordered polymer microstructure defines an open volume and a structure of a first continuous material of the three-dimensional composite material.

Then, at block 2070, a second continuous material is placed in the open volume defined by the 3D ordered polymer microstructure. Here, the second continuous material and the first continuous material share an interface between each other and have physical properties differing from each other, and wherein the interface is everywhere continuous.

Figure 11:
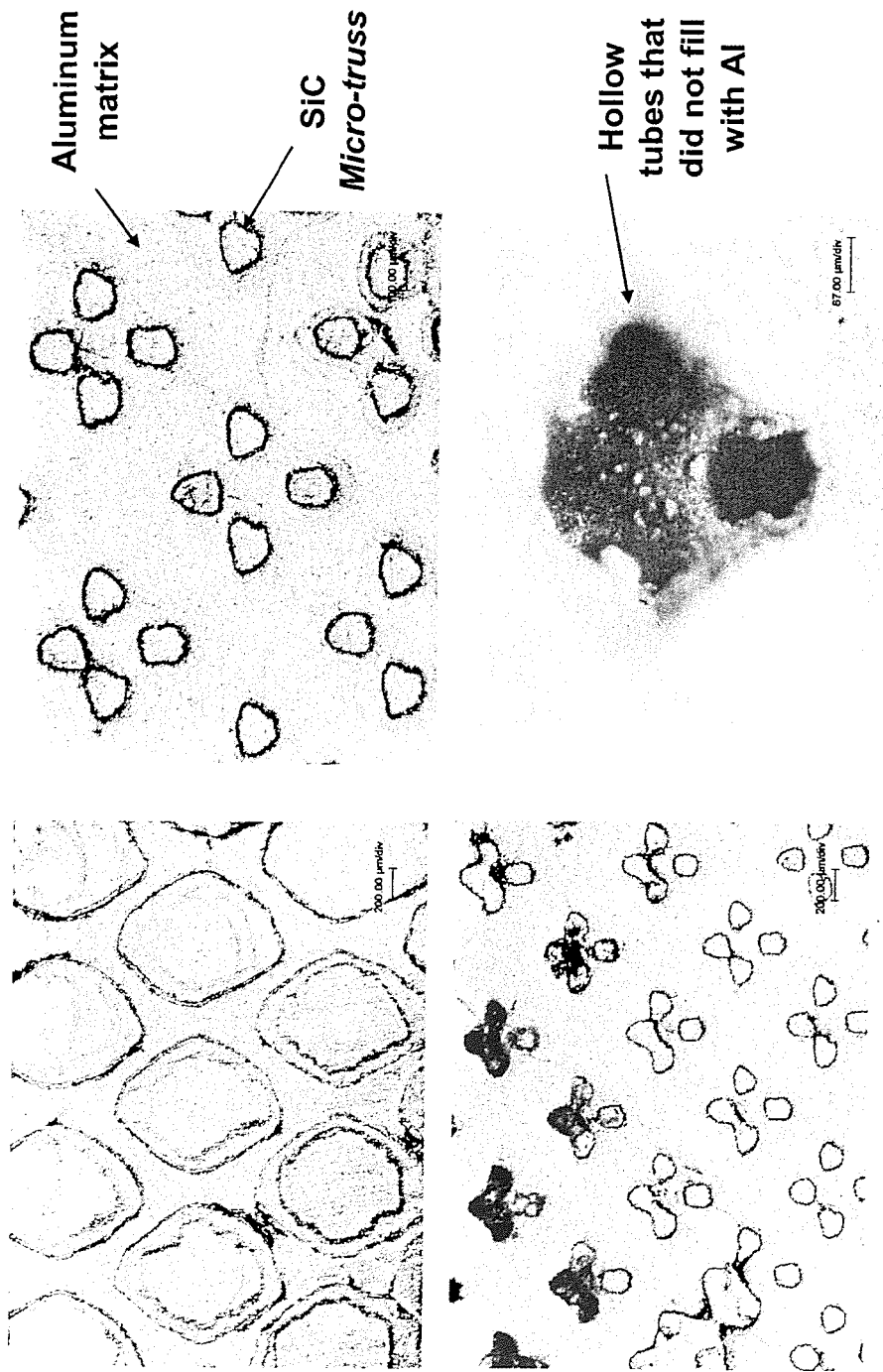
FIG. 11 is a light micrograph showing a composite material (SiC—Al) according to an embodiment of the present invention.

FIG. 11 is a light micrograph showing a composite material (SiC—Al) according to an embodiment of the present invention. Here, the silicon-carbide (SiC)—aluminum (Al) composite material in FIG. 11 was made with the following steps.

In step 1, the polymer microstructure was made using the waveguide process as described above with respect to FIG. 5 or 10.

In step 2, the polymer microstructure was then carbonized to form a carbon microstructure.

In step 3, the carbon microstructure was coated with SiC by chemical vapor deposition (CVD) at high temperature >1000 degC in an inert atmosphere. The thickness of the SiC layer is ~20 microns although it can easily be thicker or thinner depending on the time of the CVD process.

Figure 12A:
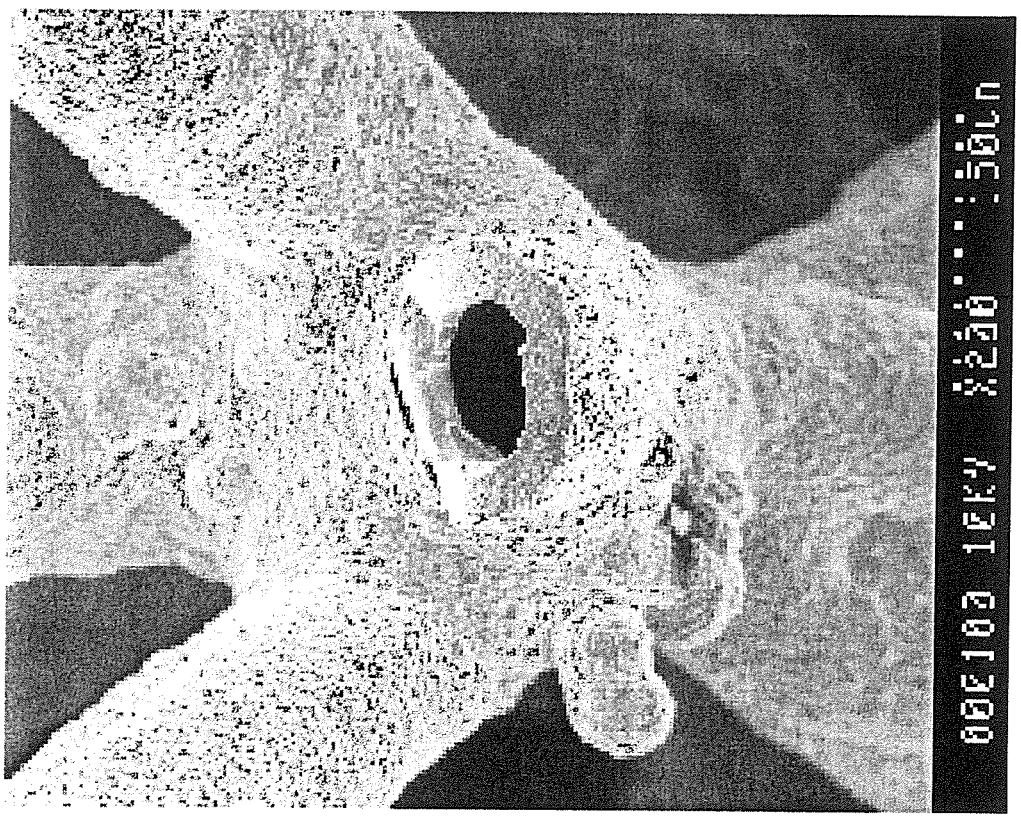
FIGS. 12a and 12b are electron micrographs showing the SiC microstructure (or tubes) after step 4 of the process.
Figure 12B:
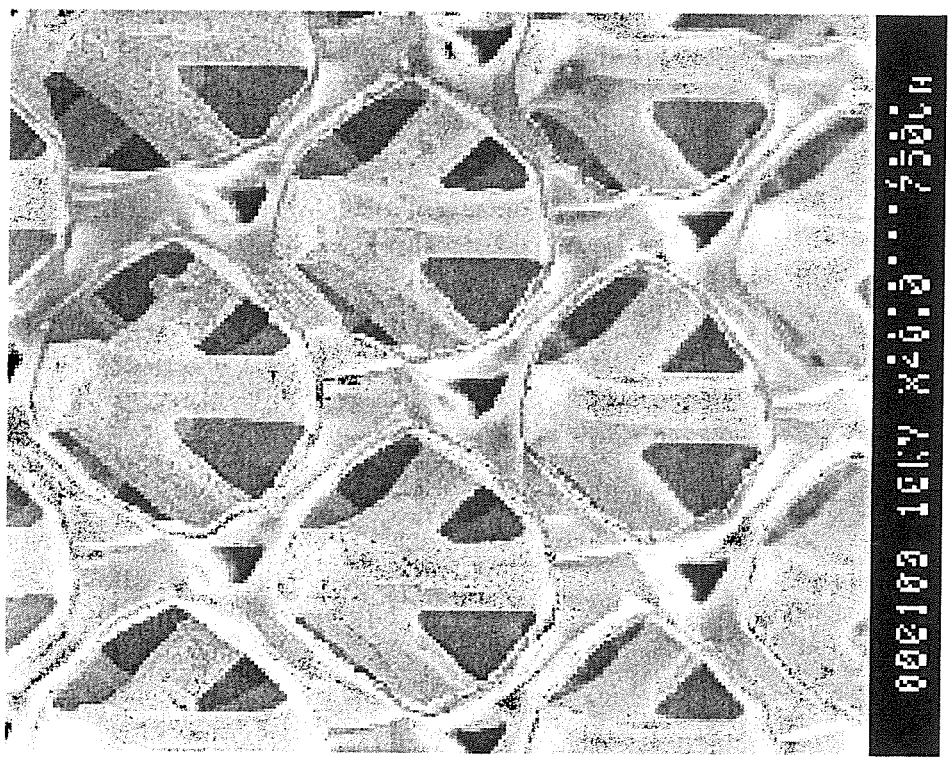

In step 4, once the SiC was coated on the carbon microstructure, the structure was heated in an oxidizing environment (air) above 600 degC to burn away the carbon microstructure. This left a micro-truss microstructure with hollow SiC tubes. FIGS. 12*a* and 12*b* are electron micrographs showing the SiC microstructure (or tubes) after step 4 of the process.

In step 5, solid aluminum was then melted in contact with the SiC microstructure in an inert atmosphere, and the Al wicked into the open volumes of the microstructure, i.e. the Al wicked inside and outside the tubes as shown the images.

In an embodiment of the present invention, a method of forming a three-dimensional composite material is provided. The method includes: securing a volume of a photo-monomer; securing a mask between at least one collimated light source and the volume of the photo-monomer, the mask having a plurality of apertures; directing a collimated light beam from the at least one collimated light source to the mask for a period of exposure time such that a portion of the collimated light beam passes through the mask and is guided by the plurality of apertures into the photo-monomer to form a plurality of waveguides through a portion of the volume of the photo-monomer; removing any uncured photo-monomer to leave behind a three-dimensional ordered open-cellular microstructure to define an open volume and a structure of a first continuous material of the three-dimensional composite material; and placing a second continuous material in the open volume, wherein the second continuous material and the first continuous material share an interface between each other and have physical properties differing from each other, and wherein the interface is everywhere continuous.

In one embodiment, the method further includes placing a third continuous material with the second continuous material, wherein the third continuous material and the second continuous material share an interface between each other and have physical properties differing from each other, and wherein the interface between the third continuous material and the second continuous material is everywhere continuous.

The first continuous material may be formed from a first material selected from the group consisting of a polymer material, a carbon material, a metal material, and a ceramic material. The second continuous material may be formed from a second material selected from the group consisting of a polymer material, a carbon material, a metal material, and a ceramic material. The third continuous material may be formed from a third material selected from the group consisting of a polymer material, a carbon material, a metal material, and a ceramic material.

In one embodiment, the metal material is formed by coating at least one surface of the three-dimensional ordered open-cellular microstructure with an aqueous solution including a metal salt and reducing the aqueous solution on the at least one surface.

In one embodiment, the metal material is formed by electroplating and/or electroless plating of a metal selected from the group consisting of nickel (Ni), copper (Cu), gold (Au), silver (Ag), ruthenium (Ru), platinum (Pt), rhodium (Rh), cobalt (Co), iron (Fe), zinc (Zn), and combinations thereof.

In one embodiment, the ceramic material is formed by: coating the three-dimensional ordered open-cellular microstructure with a ceramic gelcasting solution; and polymerizing the ceramic gelcasting solution by adding a catalyst to the ceramic gelcasting solution such that the ceramic gelcasting solution is solidified, wherein the ceramic gelcasting solution includes a dispersed monomer; and removing the dispersed monomer by heating the coated three-dimensional ordered open-cellular microstructure.

In one embodiment, the ceramic material is formed by: forming a green body by filling the open volume of the three-dimensional ordered open-cellular microstructure with a ceramic slurry; and heating the green body to provide sintering and additional mechanical strength.

In one embodiment, the ceramic material is formed by: coating the three-dimensional ordered open-cellular microstructure with a solution including a preceramic polymer; and heating the coated three-dimensional ordered open-cellular microstructure in an inert environment.

In one embodiment, at least one of the first continuous material, the second continuous material, or the third continuous material is formed by performing chemical vapor deposition of a material selected from the group consisting of silicon carbide, silicon nitride, hafnium carbide, chromium carbide, boron nitride, boron carbide, aluminum oxide, titanium, titanium diboride, titanium nitride, zirconium dioxide, titanium carbide, titanium carbonitride, tantalum, tantalum carbide, tantalum nitride, nobelium, and combinations thereof.

According to another embodiment of the present invention, a method of forming a three-dimensional composite material includes: securing a volume of a photo-monomer; securing a mask between at least one collimated light source and the volume of the photo-monomer, the mask having a plurality of apertures; directing a collimated light beam from the at least one collimated light source to the mask for a period of exposure time such that a portion of the collimated light beam passes through the mask and is guided by the plurality of apertures into the photo-monomer to form a plurality of waveguides through a portion of the volume of the photo-monomer; removing any uncured photo-monomer to leave behind a three-dimensional ordered open-cellular microstructure including a first continuous material, wherein the three-dimensional ordered open-cellular microstructure defines an open volume; and placing a second continuous material with the three-dimensional ordered open-cellular microstructure at the open volume to form the three-dimensional composite material, wherein the second continuous material and the waveguides of the three-dimensional ordered open-cellular microstructure have physical properties differing from each other.

In one embodiment, the method further includes placing a third continuous material with the second continuous material, wherein the third continuous material and the second continuous material share an interface between each other and have physical properties differing from each other, and wherein the interface is everywhere continuous.

In one embodiment, the placing the second continuous material (or the third continuous material) includes filling the open volume with a second photo-monomer having different physical properties with respect to the photo-monomer for forming the three-dimensional ordered open-cellular microstructure; and curing the second photo-monomer.

In one embodiment, the placing the second continuous material (or the third continuous material) includes filling the open volume with a molten thermoplastic polymer.

In one embodiment, the placing the second continuous material (or the third continuous material) includes increasing a carbon yield of the three-dimensional ordered open-cellular structure.

In one embodiment, the placing the second continuous material (or the third continuous material) includes coating at least one surface of the three-dimensional ordered open-cellular microstructure with an aqueous solution that includes a metal salt and reducing the aqueous solution on the at least one surface.

In one embodiment, the placing the second continuous material (or the third continuous material) includes performing electroplating and/or electroless plating of a metal selected from the group consisting of nickel (Ni), copper (Cu), gold (Au), silver (Ag), ruthenium (Ru), platinum (Pt), rhodium (Rh), cobalt (Co), iron (Fe), zinc (Zn), and combinations thereof.

In one embodiment, the placing the second continuous material (or the third continuous material) includes: coating the three-dimensional ordered open-cellular microstructure with a ceramic gelcasting solution; and polymerizing the ceramic gelcasting solution by adding a catalyst to the ceramic gelcasting solution such that the ceramic gelcasting solution is solidified.

In one embodiment, the ceramic gelcasting solution includes a dispersed monomer, and wherein the placing the second continuous material (or the third continuous material) further includes removing the dispersed monomer by heating the coated three-dimensional ordered open-cellular microstructure.

In one embodiment, the placing the second continuous material (or the third continuous material) includes: forming a green body by filling the open volume of the three-dimensional ordered open-cellular microstructure with a ceramic slurry; and heating the green body to provide sintering and additional mechanical strength.

In one embodiment, the placing the second continuous material (or the third continuous material) includes performing chemical vapor deposition of a material selected from the group consisting of silicon carbide, silicon nitride, hafnium carbide, chromium carbide, boron nitride, boron carbide, aluminum oxide, titanium diboride, titanium nitride, zirconium dioxide, titanium carbide, titanium carbonitride, tantalum carbide, tantalum nitride, and combinations thereof.

In one embodiment, the placing the second continuous material (or the third continuous material) includes: coating the three-dimensional ordered open-cellular microstructure with a solution including a preceramic polymer; and heating the coated three-dimensional ordered open-cellular microstructure in an inert environment.

In view of the foregoing, a composite structure (or material) according to an embodiment of the present invention includes at least two continuous interpenetrating phases. In one embodiment, the at least two phases have a distinguishable interface, where the structure of at least one phase has order in three-dimensions at a micrometer scale, and where the three-dimensional order is or is derived from an open-cellular three-dimensional interconnected pattern of polymer optical waveguides. In one embodiment, at least one phase is a polymer, carbon, graphitic, ceramic, metal, intermetallic, and/or air.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A method of forming a three-dimensional composite material, the method comprising:
   securing a volume of a photo-monomer;
   securing a mask between at least one collimated light source and the volume of the photo-monomer, the mask having a plurality of apertures;
   directing a collimated light beam from the at least one collimated light source to the mask for a period of exposure time such that a portion of the collimated light beam passes through the mask and is guided by the plurality of apertures into the photo-monomer to form a plurality of waveguides through a portion of the volume of the photo-monomer;
   removing any uncured photo-monomer to leave behind a three-dimensional ordered open-cellular microstructure to define an open volume and a structure of a first continuous material of the three-dimensional composite material; and
   placing a second continuous material in the open volume to substantially fill the open volume of at least one cell defined by the first continuous material,
   wherein the second continuous material and the first continuous material share an interface between each other and have physical properties differing from each other, and
   wherein the interface is everywhere continuous.

2. The method of claim 1, wherein the first continuous material is formed from a first material selected from the group consisting of a polymer material, a carbon material, a metal material, and a ceramic material, and wherein the second continuous material is formed from a second material selected from the group consisting of a polymer material, a carbon material, a metal material, and a ceramic material.

3. The method of claim 2, wherein the metal material of the first material or the second material is formed by coating at least one surface of the three-dimensional ordered open-cellular microstructure with an aqueous solution comprising a metal salt and reducing the aqueous solution on the at least one surface.

4. The method of claim 2, wherein the metal material of the first material or the second material is formed by electroplating and/or electroless plating of a metal selected from the group consisting of nickel (Ni), copper (Cu), gold (Au), silver (Ag), ruthenium (Ru), platinum (Pt), rhodium (Rh), cobalt (Co), iron (Fe), zinc (Zn), and combinations thereof.

5. The method of claim 2, wherein the ceramic material of the first material or the second material is formed by:
   coating the three-dimensional ordered open-cellular microstructure with a ceramic gelcasting solution; and
   polymerizing the ceramic gelcasting solution by adding a catalyst to the ceramic gelcasting solution such that the ceramic gelcasting solution is solidified, wherein the ceramic gelcasting solution comprises a dispersed monomer; and
   removing the dispersed monomer by heating the coated three-dimensional ordered open-cellular microstructure.

6. The method of claim 2, wherein the ceramic material of the first material or the second material is formed by:
   forming a green body by filling the open volume of the three-dimensional ordered open-cellular microstructure with a ceramic slurry; and
   heating the green body to provide sintering and additional mechanical strength.

7. The method of claim 2, wherein the ceramic material of the first material or the second material is formed by:
   coating the three-dimensional ordered open-cellular microstructure with a solution comprising a preceramic polymer; and
   heating the coated three-dimensional ordered open-cellular microstructure in an inert environment.

8. The method of claim 1, wherein at least one of the first continuous material or the second continuous material is formed by performing chemical vapor deposition of a material selected from the group consisting of silicon carbide, silicon nitride, hafnium carbide, chromium carbide, boron nitride, boron carbide, aluminum oxide, titanium, titanium diboride, titanium nitride, zirconium dioxide, titanium carbide, titanium carbonitride, tantalum, tantalum carbide, tantalum nitride, nobelium, and combinations thereof.

9. The method of claim 1, wherein the first continuous material is a carbon material.

10. The method of claim 9, wherein the carbon material is carbon.

11. The method of claim 1, wherein the first continuous material is a carbon material and wherein the second continuous material is a ceramic material.

12. The method of claim 11, wherein the carbon material is carbon and wherein the ceramic material is silicon carbide.

13. The method of claim 11, further comprising:
removing the carbon material to leave behind the ceramic material.

14. The method of claim 13, wherein the ceramic material is silicon carbide.

15. The method of claim 1, wherein the first continuous material and the second continuous material are both solid.

16. A method of forming a three-dimensional composite material, the method comprising:
securing a volume of a photo-monomer;
securing a mask between at least one collimated light source and the volume of the photo-monomer, the mask having a plurality of apertures;
directing a collimated light beam from the at least one collimated light source to the mask for a period of exposure time such that a portion of the collimated light beam passes through the mask and is guided by the plurality of apertures into the photo-monomer to form a plurality of waveguides through a portion of the volume of the photo-monomer;
removing any uncured photo-monomer to leave behind a three-dimensional ordered open-cellular microstructure to define an open volume and a structure of a first continuous material of the three-dimensional composite material; and
placing a second continuous material and a third continuous material in the open volume to substantially fill the open volume of at least one cell defined by the first continuous material,
wherein the first continuous material and the third continuous material share a first interface between each other and have physical properties differing from each other, and the first interface between the third continuous material and the second continuous material is everywhere continuous, and
wherein the third continuous material and the second continuous material share a second interface between each other and have physical properties differing from each other, and the second interface between the third continuous material and the second continuous material is everywhere continuous.

17. The method of claim 16, wherein the first continuous material is formed from a first material selected from the group consisting of a polymer material, a carbon material, a metal material, and a ceramic material, wherein the second continuous material is formed from a second material selected from the group consisting of a polymer material, a carbon material, a metal material, and a ceramic material, and wherein the third continuous material is formed from a third material selected from the group consisting of a polymer material, a carbon material, a metal material, and a ceramic material.

18. The method of claim 16, wherein the first continuous material is a carbon material, wherein the second continuous material is a ceramic material, and wherein the third continuous material is a metal material.

19. The method of claim 18, wherein the carbon material is carbon, wherein the ceramic material is silicon carbide, and wherein the metal material is aluminum (Al).

20. The method of claim 19, further comprising:
removing the carbon material to leave behind the ceramic material.

21. The method of claim 18, wherein the ceramic material is silicon carbide, and wherein the metal material is aluminum (Al).

* * * * *